United States Patent [19]
Kostreski

[11] Patent Number: 5,666,365
[45] Date of Patent: Sep. 9, 1997

[54] SIMULCAST TRANSMISSION OF DIGITAL PROGRAMS TO SHARED ANTENNA RECEIVING SYSTEMS

[75] Inventor: Bruce Kostreski, Wheaton, Md.

[73] Assignee: Bell Atlantic Network Services, Inc., Arlington, Va.

[21] Appl. No.: 554,014

[22] Filed: Nov. 6, 1995

Related U.S. Application Data

[63] Continuation-in-part of Ser. No. 409,574, Mar. 24, 1995, which is a continuation-in-part of Ser. No. 405,558, Mar. 16, 1995.

[51] Int. Cl.$^6$ ............................... H04N 7/08; H04N 5/21
[52] U.S. Cl. .................... 370/486; 370/537; 348/614
[58] Field of Search ........................ 370/50, 69.1, 112, 370/73, 485, 486, 487, 498, 535, 537; 455/4.1, 3.1, 4.2, 51.1, 51.2; 348/607, 614, 7.611, 12, 13, 423, 385, 387, 723; 375/266, 267, 347, 348

[56] References Cited

U.S. PATENT DOCUMENTS

| | | |
|---|---|---|
| 2,629,816 | 2/1953 | Rabuteau . |
| 3,836,726 | 9/1974 | Wells et al. . |
| 4,255,814 | 3/1981 | Osborn . |
| 4,718,109 | 1/1988 | Breeden et al. . |
| 5,038,403 | 8/1991 | Leitch . |
| 5,111,298 | 5/1992 | Koo ................................ 455/67.4 |
| 5,117,503 | 5/1992 | Olson . |
| 5,119,196 | 6/1992 | Ayanoglu et al. .............. 348/614 |
| 5,127,101 | 6/1992 | Rose, Jr. . |
| 5,128,925 | 7/1992 | Dornstetter et al. . |
| 5,230,086 | 7/1993 | Saul . |
| 5,231,494 | 7/1993 | Wachob . |
| 5,239,671 | 8/1993 | Linquist et al. . |
| 5,239,672 | 8/1993 | Kurby et al. . |
| 5,243,598 | 9/1993 | Lee . |
| 5,268,933 | 12/1993 | Averbuch . |
| 5,274,666 | 12/1993 | Dowdell et al. . |
| 5,355,529 | 10/1994 | Linquist et al. . |
| 5,404,575 | 4/1995 | Lehto . |
| 5,526,034 | 6/1996 | Hoarty et al. ..................... 348/7 |

OTHER PUBLICATIONS

Caffrey, J., "MMDS (Wireless Cable): An Alternative Delivery Medium for Digital Terrestrial Television," International Broadcasting Convention, 16–20 Sep. 1994, Conference Publication No. 397. ©IEE, 1994.

Lambert, Peter, "FM Wireless TV to Bite the Apple," Broadcasting, Dec. 21, 1992, pp. 46–47.

*Primary Examiner*—Douglas W. Olms
*Assistant Examiner*—Chau T. Nguyen
*Attorney, Agent, or Firm*—Lowe, Price, LeBlanc & Becker

[57] ABSTRACT

Within a desired service area, multiple transmitters at separately located sites simultaneously broadcast the same multi-channel, multi-program signal. Broadcast waves from the transmitters propagate throughout substantially overlapping portions of the service area. Each broadcast channel carries a multiplexed digital data stream containing packets of information for a plurality of programs, e.g. television programs. A shared antenna system, typically including multiple receiving antennae aimed at a plurality of the transmitters, supplies received signals to terminals in a plurality of living units. The shared system includes delayed signal processing circuitry to supply an optimal signal from the receiving antennae to the terminals. The delayed signal processing circuitry has a processing time window of a predetermined value at least as large as the difference in arrival time of signals propagating to the shared system from the nearest and farthest transmitters from which the shared system receives direct transmissions.

36 Claims, 15 Drawing Sheets

SIMULCAST TRANSMISSION OF DIGITAL PROGRAMS TO SHARED ANTENNA RECEIVING SYSTEMS

CROSS-REFERENCE TO RELATED APPLICATION

This application is a continuation in part of co-pending U.S. patent application Ser. No. 08/409,574 filed Mar. 24, 1995 entitled "SIMULCAST TRANSMISSION OF DIGITAL PROGRAMS TO SHARED ANTENNA RECEIVING SYSTEMS" which is a continuation in part of co-pending U.S. patent application Ser. No. 08/405,558 filed Mar. 16, 1995 entitled "SIMULTANEOUS OVERLAPPING BROADCASTING OF DIGITAL PROGRAMS", the disclosures of which are incorporated herein entirely by reference.

TECHNICAL FIELD

The present invention relates to wireless distribution of program information, e.g. video, audio and data, particularly to shared antenna receiving systems serving multiple living units. More specifically, the present invention relates to simultaneous distribution of multiple RF channels from separately located transmitters to such receiving systems, wherein each RF channel carries a digital transport stream containing multiplexed data relating to a plurality of different programs.

BACKGROUND ART

"Wireless cable" is a term usually used to refer to a multi-channel video distribution medium that resembles franchise cable television, but which uses microwave channels rather than coaxial cable or wire to transmit programming to the subscriber. Programming for wireless cable systems is received at the headend of the wireless cable system in the same manner as it is for landline based cable television. These programs are then retransmitted, utilizing the high end of the Ultra High Frequency (UHF) portion of the microwave radio frequency spectrum (2.1 to 2.7 Ghz), by a microwave transmitting antenna located on a tower or other tall structure to small antennas on subscriber rooftops, typically within a 40 mile radius.

To a user or subscriber, wireless cable operates as a cable look-alike service. Because wireless cable signals are transmitted over the air rather than through underground or above-ground cable networks, wireless systems are less susceptible to outages and are less expensive to operate and maintain than franchise cable systems. Most service problems experienced by wireless cable subscribers are home-specific rather than neighborhood-wide, as is frequently the case with franchise cable systems.

The evolution of wireless cable may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. Rules reallocated eight of those channels for outright commercial use, and educational organizations were permitted to lease excess hours to commercial operators on the remaining 20 channels. In any local market, this makes it possible for a commercial operator to combine any or all of those 28 channels with five other channels already available for commercial use. Under current FCC rules, the available spectrum results in a maximum of 33 analog channels. This number of 'wireless cable' channels is less than the number offered on many competing franchise type cable television systems.

Since 1983 spectrum blocks in the 2.1–2.7 Ghz range have been allocated for the purpose of delivering video content from a single transmit site to multiple receive locations. A total of 198 Mhz has been allocated for downstream transmission for the wireless cable service. The channelization and transmission modulation (6 Mhz amplitude modulation/vestigial side band) are equivalent to broadcast TV or cable but up-converted to microwave frequencies.

The 33 channels potentially available to wireless cable operators therefore are subdivided into two types of channels. Twenty channels are referred to as ITFS. The remaining 13 channels are generally referred to as Multi-channel Multipoint Distribution Service (MMDS).

The current UHF spectrum was originally licensed in blocks of four video channels each separately licensed, with each block allocated to a specific purpose. Five groups, each with four channels, were allocated to Instructional Television Fixed Service (ITFS). ITFS spectrum was initially made available only to educational institutions. Two groups of four channels were made available to anyone wishing to provide an alternative multi-channel video program service. The final four channels were licensed individually to institutions for the purpose of providing a private video network. Over time, the FCC relaxed some of these operational rules. Through licensing and leasing arrangements, the FCC now allows all of the channels to be aggregated for the purpose of providing an alternative to franchise cable television. However, even in areas where it is possible for one operator to aggregate the necessary licenses, the system capacity is still limited, i.e. to 33 channels or less.

In many ways, current typical UHF wireless TV is equivalent to at most a low tier franchise cable television system (i.e. having relatively few channels). Other than the number of program channels, the only real difference arises in the medium used to transport signals from the headend to the customer. Functionally identical headend equipment is utilized in both systems. In the case of UHF service, signals leave the headend via a microwave transmitter. With cable television, the same signals leave the headend on fiber or coaxial cable facilities. However, wireless cable systems have had difficulty competing because today many cable systems offer a more diverse range of programs.

In a typical prior art system, such as shown in FIG. 1, a headend system H receives up to a maximum of 33 analog television program signals from a variety of satellite downlink receivers and other types of receivers, in the exact same manner as for a cable television system. The headend system H frequency multiplexes those television program signals into a combined spectrum signal in the 50–450 Mhz range. This combined signal has a frequency distribution similar to that found on a cable television network. The headend system upconverts the combined spectrum signal to the UHF frequency range, typically centered around 2.6 Ghz. The headend system supplies the UHF signal to a single transmitter antenna tower T which broadcasts the signal to subscribers who each have an individual home receiving system. Subscribers can call in to the headend to order pay-per-view events via the telephone network, and the headend transmits codes to the subscribers systems to enable descrambling of encoded pay-per-view programs.

FIG. 1A shows a typical service area for a wireless cable type system of the type shown in FIG. 1. In accord with relevant regulations, a multi-channel multi-point distribution service (MMDS) type wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel(s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at a receiver location by direct line-of-sight (LOS) transmission. Typically an elliptical dish shaped antenna 18–36 inches long, formed of parallel curved elements, is aimed from the subscriber location to receive the strongest signal from the transmitter. The captured signals are down-converted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the UHF antenna to pick up the local programming.

As noted, propagation characteristics at the relevant UHF operating frequencies require line-of-sight (LOS) between the transmit and receive antennas for reliable service reception. Both natural obstructions such as hills and vegetation, and man-made obstructions such as buildings, water towers and the like, limit the actual households capable of receiving an LOS transmission. FIG. 1A also shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low. Overcoming blockages caused by many different obstructions to the primary transmissions and attendant distortions that result when amplifying combined RF channels would require an inordinate number of low-power repeaters. Also, because of delays and multipath effects, repeater transmissions may interfere with reception from the primary source in areas close to the blockage area B.

In the industry, a nominal figure for households reachable by LOS transmission is 70%, even with a small, commercially practical number of repeaters. This projected number is based solely on computer models, not actual field measurements. It is believed that actual coverage by the current wireless cable technology in the UHF medium is considerably lower. Typical antenna heights required to achieve the present level of coverage in commercial service are 800-plus feet for transmitters and 30–60 feet for receivers. That means that many receive antennas must be mounted atop masts or nearby trees as an alternative to a rooftop mounting. While current regulations provide a 15 mile protected service area for MMDS, it is desired that effective system coverage for approximately 40–70% of the affected households may be achieved to a 40 mile radius from the transmitter antenna.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., rain or temperature and pressure inversions. Rain can act to partially reflect or absorb the microwave signals. Weather inversions can result in an upward bending of the wave front due to refraction. There are engineering measures to mitigate the troublesome effects of time-variant path fading, such as suitable fade margins and antenna diversity.

In the paging and radio communication fields, various systems of sequencing and simulcasting have been proposed to achieve some increased coverage. Examples of typical proposed systems are illustrated in FIG. 2 and 3. The related systems are described in U.S. Pat. Nos. 3,836,726, issued September 1974 and U.S. Pat. No. 5,038,403 issued Aug. 6, 1991. FIG. 2 illustrates a system utilizing sequencing while FIG. 3 illustrates a system utilizing simulcasting. As can be seen, the aim is to cover maximum area with minimum area of signal overlap. Even if someone suggested application to UHF Wireless Cable type communications, such propagation fields would still exhibit the above noted problems due to obstructions, multi-path interference and fading.

Clearly a need exists for a broadcast system providing increased propagation coverage and reduced areas of blockages. Any such system should also provide an increased number of programs, without requiring additional spectrum allocation. The system should provide good signal quality throughout the entire reception area or service area. Accordingly, it is also desirable to minimize multipath interference and loss of service due to fading.

An additional set of problems arise in providing the wireless cable service to certain types of multiple living unit residences. Many planned development communities have restrictive covenants which run with ownership of the property. In such communities, whether the homes are town houses or single family homes, the covenants may prevent installation of visible outside receiving antennae. Also, only a few homes in the community may have a good location for a line of sight receiving antenna. In apartment complexes, the residents may not be able to locate a dish type antenna outside at all, or if allowed to have such an outside antenna, they may not have access to a point on the building from which to aim the antenna at the transmitter tower.

Clearly an additional need exists for cost effective systems for supplying wireless cable broadcast signals to multiple living unit installations.

Disclosure of the Invention

The present invention provides methods and systems (e.g. shared receiving systems) to address the above stated needs. The present invention contemplates an RF frequency simulcasting method for transmitting information from multiple spaced transmitting sites to multiple receiving sites in a reception area. A signal including multiplexed channels is transmitted simultaneously from a plurality of spaced transmitting sites. The transmitting sites propagate the signal into substantially overlapping regions of at least a major portion or the intended reception area. At a multiple living unit type subscriber premises, shared processing circuitry receives a signal containing a plurality of time delayed copies of the transmitted signal. At least a portion of the received signal is processed to acquire a single copy of a signal corresponding to each of the multiplexed channels, and information contained in the acquired signal is presented, e.g. in a form that is sensorially perceptible to a plurality of users.

The overlapping transmissions or propagation areas reduce or eliminate blockage zones and effects of fading. This technique also limits the number of receivers effected by equipment outages. Typically, a directional receiving antenna can be aimed toward at least one strong line-of-sight transmission source. In many locations, particularly in urban areas, the shared circuitry receives many multipath reflections and may receive multiple time-offset copies of directly transmitted signals from two or more of the transmitters. The delayed signal processing circuitry in the shared system resolves the multiple signal copies.

Because the delayed signal processing circuitry is shared by many subscribers residing in the living units, the expense thereof is distributed amongst many individuals. The shared system therefore can utilize relatively high quality delay processing circuits, e.g. having a wide delay processing window.

In the preferred embodiments, the delay processing window of the delayed signal processing circuits is at least as large as the difference in arrival times of signals propagating from two separate transmitter antennae to the antenna(s) of the shared receiving system. In the exemplary systems described in detail below, the window exceeds this difference value by an amount sufficient to allow processing of multi-path delayed signals arriving after the direct transmission signal from the most distant aligned transmitting antenna.

The delayed signal processing circuitry can take several forms. In a broadcast system using spread spectrum technology, the shared receiving system would include spread spectrum receivers and rake receivers. In the preferred embodiment described in greatest detail, the shared receiving system includes time domain adaptive delay equalizers.

To increase the number of programs broadcast by a system operating in accord with the above simulcasting method, each of the multiplexed channels carries a multiplexed stream of digital data representing a plurality of programs. The programs may be audio or data, but in the currently preferred embodiment, the programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

In an exemplary implementation of a headend used with the present invention, real-time encoders receive video programs and encode the information for those programs into packets of compressed digital data, e.g. in accord with a recognized video compression standard. The headend may also receive previously encoded video program material from other sources, such as a digital server or a digital transmission media. Multiplexers combine digital data for groups of programs into the multiplexed packet data streams, sometimes referred to as 'transport streams'. A digital modulator, such as a 64 or 256 QAM modulator, modulates each digitally multiplexed packet data stream for transport in one unique RF channel. A combined spectrum signal containing the RF channels is upconverted to place the channels into available frequency channels in the UHF range.

The combined spectrum signal is supplied to a plurality of microwave broadcast transmitters located at spaced apart sites about the service area or reception region. Appropriate delays are imposed in one or more of the lines to the transmitters so that the transmissions from all the transmitter antennae occur simultaneously and in phase with each other. At each receiver site, one or more antennae receive signals from at least one of the transmitters. Preferably, each antenna is a directional antenna aimed at one of the transmitters for line-of-sight reception therefrom.

The shared receiving system of the present invention typically serves homes in a specific community, a town house development, an apartment or hotel building, or the like. The shared receiving system receives direct broadcast signals and multipath reflected signals from at least two of the transmitters. At some locations the receiving system includes two or more directional receiving antennae, each of which receives a signal including the multiplexed channels from a different one of the transmitters. This effectively provides an angular diversity in reception. At other locations, the field of view of one directional receiving antenna includes two of the transmitters.

A shared signal processing circuit processes the directly received signals and/or multipath signals, and in response thereto, outputs a single optimized representation of the signal simulcast from the transmitters. A distribution system then broadcasts the single optimized representation from the shared processing circuitry to terminals located in a plurality of the living units. Each terminal receives the single optimized representation via the distribution system and processes a selected one of the multiplexed channels to present program information from the selected channel.

Preferred embodiments of the shared processing circuitry are described in detail below. To summarize briefly, one type of shared circuitry processes each frequency channel to compensate for multiple time delayed copy interference and remodulates each digital transport stream into a channel for broadcast to terminals in the living units served by the shared system. In such an implementation, each terminal device includes a wireless signal processor and a digital signal processor. The wireless signal processor, typically part of an interface module connected by a cable to the shared processing circuitry, processes the received signal to select one of the channels. The wireless signal processor effectively acquires a digital multiplexed data stream from the selected channel and supplies that data stream to the digital signal processor. The digital signal processor selects packets of data relating to a selected one of the programs. The digital processing section processes the compressed, digitized data from those packets to produce signals presentable to a user. In the preferred embodiment, the digital signal processor produces signals to drive a standard television set.

In a second implementation, in addition to the delayed signal processing circuitry, the shared circuitry includes digital processors. The digital processors capture individual programs from the transport stream and convert those programs to standard analog television signal format. The analog programs are then modulated into CATV type broadcast channels and broadcast to analog terminal devices in the individual living units.

The shared receiving system should reduce objections under various restrictive covenants in multi-unit type single family and town house developments. Also, the shared system provides a convenient technique for supplying the simulcast programming to multi-unit dwellings or communities.

The angular diversity provided by use of multiple directional receiving antennae reduces the impact of fading. In many instances, atmospheric conditions causing fading will not effect the reception from all of the transmitters in the same way at the same time. As a result, it will be possible to still select and output a signal containing all of the multiplexed channels at an effective power level from the shared processing circuitry to the terminals served by the shared receiving system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

In accord with the present invention, groups of program signals are digitally encoded and compressed, and the compressed program streams are time division multiplexed into digital transport streams. Each digital transport stream is modulated and/or upconverted into one RF channel, in the preferred embodiment a channel in the high end of the ultra high frequency (UHF) microwave range (e.g. 2.1 to 2.7 GHz), although other frequency channels could be used. Separately located transmitters simultaneously broadcast a UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 4:
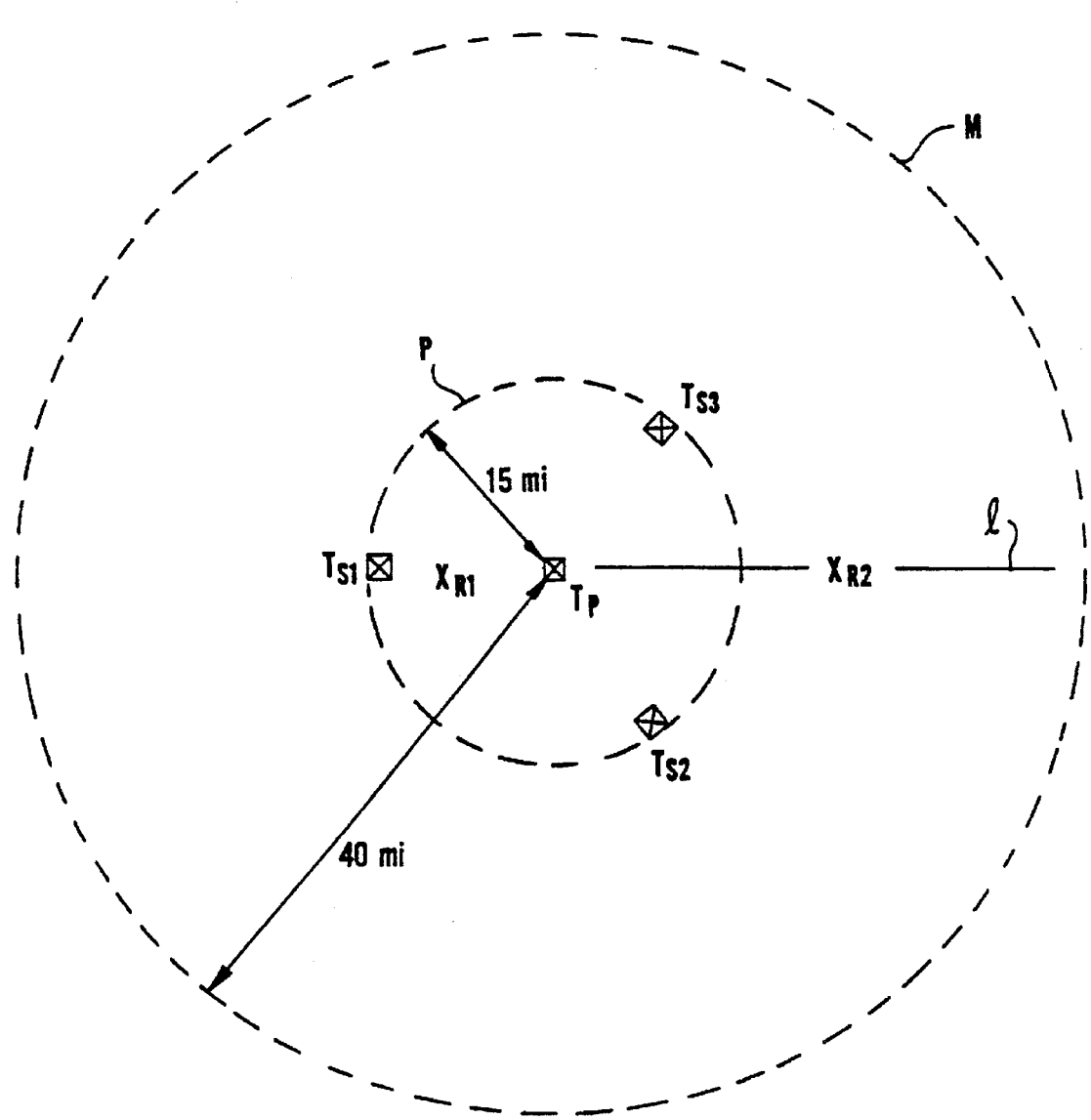
FIG. 4 depicts an exemplary service area and transmitter layout for simulcast transmissions into a receiving area.

Referring to FIG. 4, the circle P defines the Protected Area or primary area which may be serviced from a primary transmitting antenna $T_P$. At the present the radius of this circle is 15 miles. However, usable signal and acceptable reception generally occurs to a radius of 40 miles which is here defined by the circle M indicating the Maximum Area. The region between the 15 mile radius and the 40 mile radius forms a 'secondary' service area. According to the invention, all or part of the rights of the educational institution for ITFS service are leased. Also, licenses are aggregated, from companies currently licensed to use MMDS channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Figure 2:
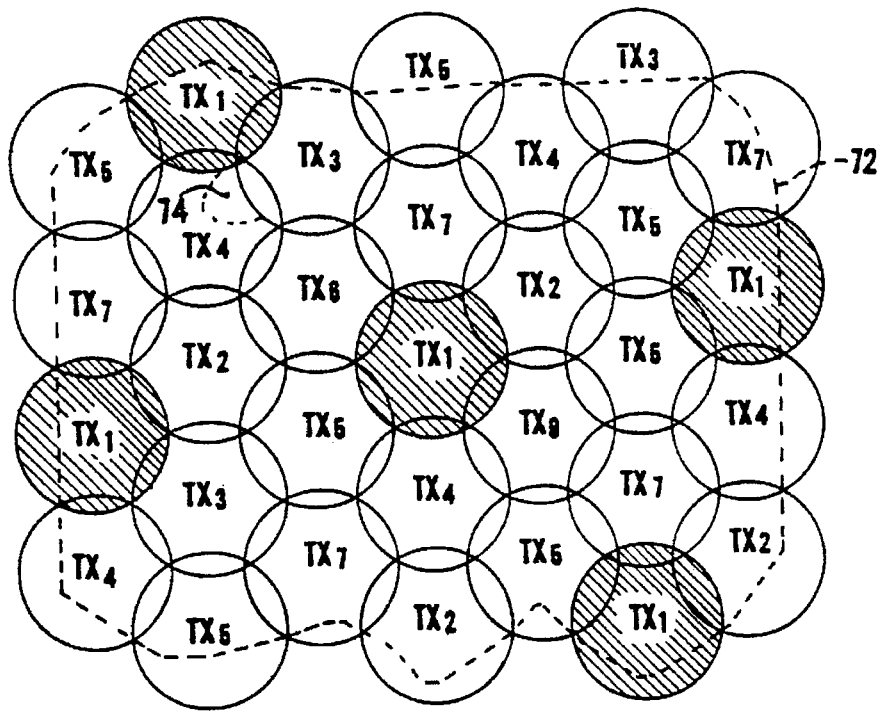
FIGS. 2 and 3 show propagation areas for multi-transmitter systems used in other types of prior art systems, e.g. paging.
Figure 3:
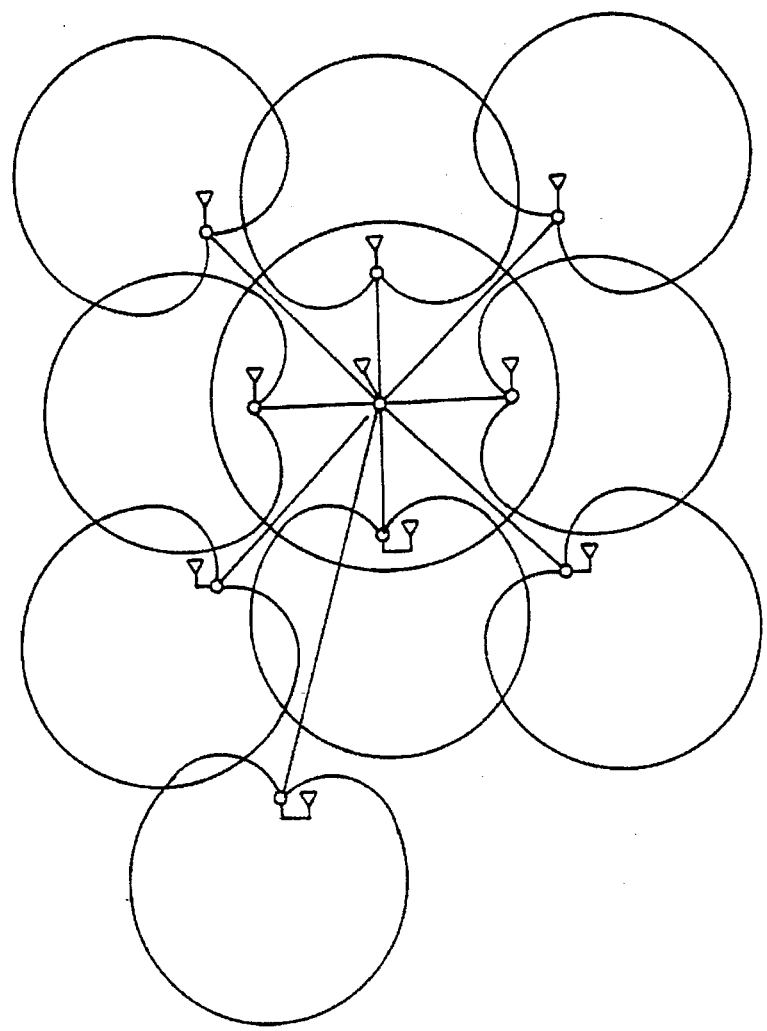
Figure 5A:
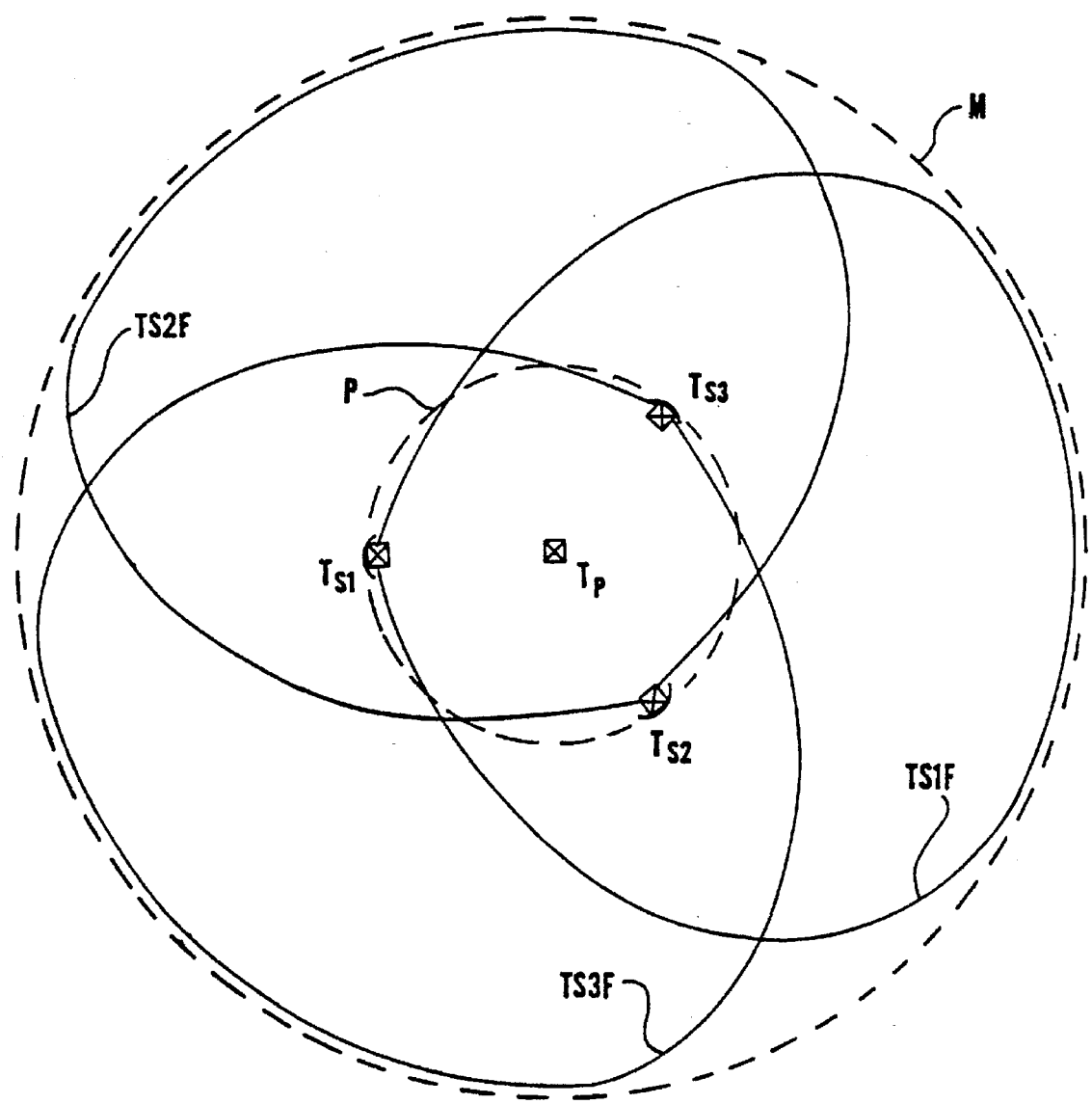
FIG. 5A depicts exemplary propagation patterns.

As shown in FIG. 5A, the central antenna $T_P$ broadcasts in an omni-directional propagation pattern. However, the secondary antennae $T_{S1}$, $T_{S2}$, and $T_{S3}$ are provided as directional antennas. The directional secondary antennae may radiate back lobes, albeit much smaller and lower in power than the cardioid shaped front lobes. Alternatively, reflectors may be provided so that these antennae substantially radiate only forward lobes as shown, TS1F for antenna $T_{S1}$, TS2F for the $T_{S2}$ antenna and TS3F for the $T_{S3}$ antenna. As shown, most locations within the primary service area P actually are within the radiation patterns of all four transmitting antennae. At most locations in the secondary area between boundary P and the maximum service area M, receivers are within the radiation patterns of the primary transmitter antenna $T_P$ and at least one and sometimes two of the secondary transmitter antennae. It will be seen that there is a radical departure from the minimum overlap approach which is conventional in the systems illustrated in FIGS. 2 and 3.

At most receiver locations in the area P, a directional antenna having approximately a 12 degree field of view can be aimed to receive transmissions from a single one of the transmitting antennae. For example, at location $X_{R1}$ (FIG. 4), a receiving antenna having a narrow field of view could be aimed at any of the four transmitting antennae which presents clear line of site reception. In particular, the receiving antenna can be aimed at the primary transmit antenna $T_P$ or at the secondary transmit antenna $T_{S1}$, whichever presents a stronger, unobstructed line of transmission to that location. Because of the directionality of the receiving antenna, the directly transmitted signal from the other non-selected transmitters will not interfere with the signal selected by the aiming of the directional antenna, e.g. if the antenna at location $X_{R1}$ is aimed at transmitter $T_{S1}$, the antenna will not receive any substantial direct transmissions from primary transmitter antenna $T_P$.

In accord with the present invention, however, complexes comprising a large number of living units, such as apartment houses, hotels and townhouse developments, utilize a shared receiving system. In the preferred embodiments, such a system includes shared processing circuitry and preferably includes a plurality of receiving antennae. The shared system typically receives direct transmissions from a plurality of the transmitters and receives multipath reflected and attenuated copies of the transmissions from several of the transmitters.

Also, many systems in accord with the present invention will provide service in densely populated metropolitan areas. In such areas, high-rise buildings reflect signal transmissions in the relevant frequency range. Where there are two or more transmitters, the multiple transmitters create increased numbers of reflected signals off of the high-rise buildings. Even at locations receiving a single direct line of sight transmission, there will be a large number of multipath reflection signals included in the signal output by the receiving antenna.

Because the shared system services a large number of customers, it is possible to use relatively high quality components in the shared processing circuitry to insure relatively high performance. In accord with the present invention, the shared circuitry includes some form of delayed signal processing circuitry to process multiple copies of each of the broadcast channels to acquire a single high quality signal for each channel representing the broadcast information for further processing.

The broadcast system may utilize spread spectrum technology, as discussed in more detail in commonly assigned U.S. patent application Ser. No. 08/405,685, filed Mar. 17, 1995 (attorney docket no. 680-117) entitled "Television Distribution System and Method" the disclosure of which is entirely incorporated herein by reference. In such an implementation, the shared circuitry would include spread spectrum receivers including rake signal processors compensating for differences in arrival time of signals from multiple transmitters and from multiple reflection paths. In the presently preferred embodiments discussed below, the shared receiving systems do not receive spread spectrum transmissions, and the shared processing circuits include adaptive delay equalizers for processing the multiple copies of the program transport signals.

The delay processors (e.g. spread spectrum receivers with rake processors or time delay equalizers) have an adequate processing window to at least allow for the maximum time difference between (1) the arrival time for a signal directly transmitted from the most distant transmitter that the system will receive and (2) the arrival time for the signal directly transmitted from the nearest transmitter that the system will receive. In the preferred embodiments, the processing window is larger than this difference by some amount which facilitates processing of multipath delayed signal copies from the more distant transmitter.

In preferred implementations of the shared receiving system, discussed below with regard to FIGS. 7 and 10, the shared system includes one receiving antenna directed towards each of a plurality of the transmitter antennae. Within the primary area P, for example, the system may include four receiving antennae directed towards the transmitter antennae $T_P$, $T_{S1}$, $T_{S2}$ and $T_{S3}$. The delay processing circuitry, a delay equalizer in the later discussed preferred embodiments, processes direct transmission signals as well as multipath signals received through the receiving antennae. Because of the size of the delay processing window, the delay processing circuitry can resolve multiple transmission signals and multipath reflected and attenuated signals for one RF channel into a single high quality representation of the signal contained in that channel.

It may be helpful to consider a series of examples of actual propagation and reception. Initially consider simplified examples, wherein all of the secondary transmitter antennae $T_{S1}$, $T_{S2}$ and $T_{S3}$ are disposed along the boundary of the Protected Area P and therefore are substantially equidistant from the primary transmitter $T_P$. In the example complying with current MMDS rules, the primary area P has a radius of 15 miles (FIG. 4). In accord with the present invention, the secondary transmitters all transmit simultaneously (and preferably in phase with each other), and the propagation patterns correspond to those shown in FIG. 5A.

As a first example, consider location $X_{R1}$ in FIG. 4. Assume for this example that $X_{R1}$ is half way between transmitter antennae $T_P$ and $T_{S1}$. Assuming for simplicity that the secondary transmitters all are separated by 120 degrees (the transmitter $T_{S2}$ is 60 degrees below the horizontal in FIG. 4 and the transmitter $T_{S3}$ is 60 degrees above the horizontal in FIG. 4), the distance between the receiver location $X_{R1}$ and each of the secondary transmitters $T_{S2}$ and $T_{S3}$ can be geometrically calculated as approximately 19.84 miles. Electromagnetic waves propagate through atmosphere at a rate of approximately 5.3 microseconds per mile. Consequently, the transmission from each of the secondary antennae $T_{S2}$ and $T_{S3}$ arrives at the receiver location $X_{R1}$ approximately 105.15 microseconds after transmission thereof. The transmission from each of the transmitter antennae $T_P$ and $T_{S1}$ arrives at location $X_{Ri}$ 39.75 microseconds after the simultaneous transmission. The difference in propagation times is 65.40 microseconds. At such a location, the delay signal processing circuitry (e.g. the equalizer or the rake processor) would have a delay processing window of at least 85 microseconds which allows approximately 20 additional microseconds for processing multipath delayed copies of the signals from the most distant secondary transmitters $T_{S2}$ and $T_{S3}$.

In most of the preferred embodiments using a delay equalizer in a service area of the approximate dimensions shown in FIG. 4, the processing window of the delay processing circuit is 100 microseconds. Consider first, however, a worst case situation. In this example, assume that the receiver location is adjacent to one of the secondary transmitters, for example, the transmitter $T_{S2}$. Signals from that transmitter would reach the receiving location almost instantaneously. Signals from the primary transmitter antenna $T_P$ would reach that location after 79.5 microseconds (15×5.3). Again assuming for simplicity that the secondary transmitters all are separated by 120 degrees (the transmitter $T_{S2}$ is 60 degrees below the horizontal in FIG. 4 and the transmitter $T_{S3}$ is 60 degrees above the horizontal in FIG. 4), the distance between the receiver location and each of the secondary transmitters $T_{S1}$ and $T_{S3}$ can be geometrically calculated as 25.97 miles. Propagation of the signals transmitted from the secondary transmitters $T_{S1}$ and $T_{S3}$ to this exemplary receiver location requires approximately 137.64 (25.97×5.3) microseconds. The time difference between the first arriving copy of the signal (from transmitter $T_{S2}$) and the copy of the signal from the most distant transmitters $T_{S1}$ and $T_{S3}$ is 137.64 microseconds.

If a shared receiving system located adjacent to transmitter $T_{S2}$ includes receiving antennae directed at all four of the transmitters, the delay processing circuitry should have a processing window of 155–160 microseconds (137.64 plus approximately 20 microseconds). However, the system can utilize delay processing circuitry having a somewhat smaller window by aiming a smaller number of directional receiving antennae at a smaller subset of the broadcast transmitters.

For example, if the receiving system includes only two receiving antenna, one aimed at the adjacent transmitter antenna $T_{S2}$ and the other aimed at the primary transmitter antenna $T_P$, then the difference in direct propagation times is 79.5 microseconds. A 100 microsecond delay equalizer could readily process such signals as wells as multipath signals from both of those transmitter antennae. As an alternative example, the receiving system adjacent $T_{S2}$ might include only three receiving antenna, one aimed at the primary transmitter antenna $T_P$, and each of the other two aimed respectively at one of the secondary transmitter antennae $T_{S1}$ and $T_{S3}$. In this example with no direct reception from the adjacent antenna $T_{S2}$, the maximum difference in direct propagation times is 58.14 (137.64–79.5) microseconds. A delay equalizer having a processing window in the range of 80–100 microseconds could readily process such signals as wells as multipath signals from all three transmitter antennae $T_P$, $T_{S1}$ and $T_{S3}$.

Also, locations exist where two transmitters are aligned in the field of view of one directional receiving antenna, and the receiving antenna cannot be aimed to receive a line of sight transmission from only one transmitter. Assume for example, that a second receive location $X_{R2}$ is somewhere along line 1 to the right of the primary transmitter antenna $T_P$. A directional antenna at that location aimed at the primary transmitter antenna $T_P$ is also aligned to receive the simulcast transmission from secondary transmitting antenna $T_{S1}$. In such receiver locations the shared receiver system includes a single receiving antenna.

In the simplest example of this situation, all of the secondary transmitter antennae $T_{S1}$, $T_{S2}$ and $T_{S3}$ again are disposed along the boundary of the Protected Area P and therefore are substantially equidistant from the primary transmitter $T_P$. In the example complying with current MMDS rules, the primary area P has a radius of 15 miles (FIG. 4). In accord with the present invention, the secondary transmitters all transmit simultaneously (and preferably in phase with each other). Electromagnetic waves propagate through atmosphere at a rate of approximately 5.3 microseconds per mile. Consequently, the transmission from one of the secondary antennae aimed inward propagates to the location of the primary antenna $T_P$ after approximately 79.5 microseconds. The primary antenna $T_P$ will broadcast the same signal at approximately the same time as each of the secondary antennae $T_{S1}$, $T_{S2}$ and $T_{S3}$. The signal from primary antenna $T_P$ therefore arrives at a location, such as $X_{R2}$, which is aligned with the primary antenna and one of the secondary antenna ($T_{S2}$ in the illustrated example) approximately 79.5 microseconds before the broadcast of the corresponding signals from the aligned secondary transmitter antennae (e.g. from $T_{S3}$).

As in the earlier examples, the delayed signal processing circuitry preferably has a delay processing window which is at least as large as the longest delay offset between arrival times of signals from two aligned transmitter antennae. In the present example, the window should be equal to or larger than approximately 79.5 microseconds. The delay processing window preferably is large enough to compensate for multipath interference from reflections of signals from the more distant transmitter, typically by an additional 20 microseconds. Thus, in the present example, the delayed signal processing circuitry (e.g. adaptive delay equalizer or spread spectrum receiver with a rake processor) has a processing window 20 microseconds longer than the delay of the last received direct transmission, i.e. 79.5+20 microseconds or approximately 100 microseconds.

Figure 5B:
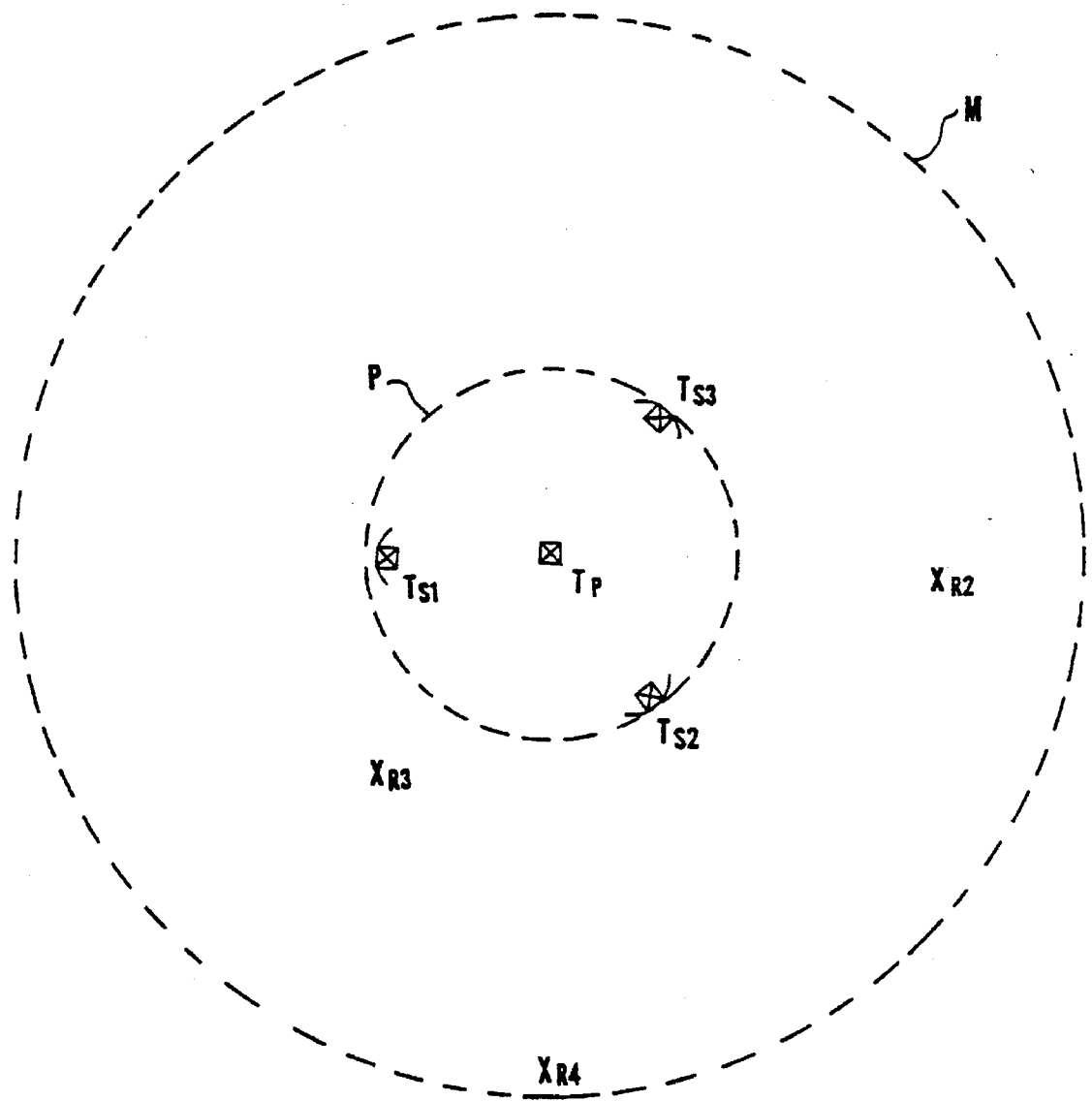
FIG. 5B depicts a more specific example of transmitter antennae locations, in accord with the present invention.

FIG. 5B presents a somewhat more complicated transmitter site layout. Again the central transmitter $T_P$ radiates an omni-directional pattern, and the secondary transmitters $T_{S1}$, $T_{S2}$ and $T_{S3}$ radiate directionally inward across the primary service area P and out into the secondary service area. In this example, however, the secondary transmitter antennae $T_{S1}$, $T_{S2}$ and $T_{S3}$ are not all equidistant from the primary transmitter antenna $T_P$. In many actual installations, the secondary transmitters will all be located at different distances from the primary transmitter antenna $T_P$. In other installations, two of the secondary transmitter antennae are equidistant but one or more of the other secondary transmitter antennae is at a different distance from the primary transmitter antenna $T_P$. Further discussion here assumes use of delay equalizers as the delayed signal processing circuits.

In the specific example illustrated, secondary transmitter antennae $T_{S2}$ and $T_{S3}$ are equidistant from the primary transmitter antenna $T_P$, i.e. 15 miles from the primary transmitter antenna $T_P$. The other secondary transmitter antenna, secondary transmitter antenna $T_{S1}$ is located 14 miles from the primary transmitter antenna $T_P$. All of the transmitters transmit the same signal at approximately the same time. In the preferred embodiment, the actual transmissions are simultaneous and in-phase with each other. Signals from the secondary transmitter antennae $T_{S2}$ and $T_{S3}$ propagate to the location of the primary transmitter in approximately 79.5 microseconds and arrive at any aligned receivers approximately 79.5 microseconds after arrival of signals broadcast by the primary transmitter antenna $T_P$. Signals from the secondary transmitter antennae $T_{S1}$ propagate to the location of the primary transmitter in approximately 74.2 microseconds and arrive at any aligned receivers approximately 74.2 microseconds after arrival of signals broadcast by the primary transmitter antenna $T_P$.

Assume for discussion here use of delay equalizers having a maximum interval or window for delay equalization of 100 microseconds. A delay equalizer having 100 microsecond delay processing window will be able to process multipath signals and multiple direct reception in an implementation such as shown in FIG. 5B. Consider now the reception of signals at various locations in line with two of the transmitting antennae.

Consider first the receiver location $X_{R2}$ shown on the right of FIG. 5B. Assume by way of example that location $X_{R2}$ is 30 miles from the site of primary antenna $T_P$. A single receiving antenna of a shared system at that location receives broadcast transmissions from the primary antenna $T_P$ and the first secondary transmitter antenna $T_{S1}$. The location $X_{R2}$ is 44 miles from the site of the secondary transmitter antenna $T_{S1}$. Signals from the primary antenna $T_P$ reach location $X_{R2}$ after 159 microseconds (30×5.3), and signals from the first secondary transmitter antenna $T_{S1}$ reach location $X_{R2}$ after 233.2 microseconds (44×5.3). The difference in the arrival time is 74.2 microseconds, i.e. within the 100 microsecond delay processing window of the adaptive delay equalizer. The equalizer window also permits processing of multipath signals arriving as much as 25.8 microseconds after the signal from the third secondary transmitter antenna $T_{S1}$.

Consider now the receiver location $X_{R3}$ shown in the lower left portion of FIG. 5B. Assume by way of example that location $X_{R2}$ is 20 miles from the site of primary antenna $T_P$. A single receiving antenna of a shared system at that location receives broadcast transmissions from the primary antenna $T_P$ and the third secondary transmitter antenna $T_{S3}$. The location $X_{R3}$ is 35 miles from the site of the secondary transmitter antenna $T_{S3}$. Signals from the primary antenna $T_P$ reach location $X_{R2}$ after 106 microseconds (20×5.3), and signals from the third secondary transmitter antenna $T_{S3}$ reach location $X_{R3}$ after 185.5 microseconds (35×5.3). The difference in the arrival time is 79.5 microseconds, which again is within the 100 microsecond delay processing window of the adaptive delay equalizer. The equalizer window also permits processing of multipath signals arriving as much as 20.5 microseconds after the signal from the third secondary transmitter antenna $T_{S3}$.

Consider now receiver location $X_{R4}$ in FIG. 5B, and assume that the secondary antennae radiate cardioid patterns substantially similar to those shown in FIG. 5A. As shown by comparing FIG. 5B to FIG. 5A, the location $X_{R4}$ approximately 40 miles due south of the primary transmitter $T_P$ is within the radiation area from the primary transmitter $T_P$ and the front lobe radiation area TS3F from the secondary transmitter $T_{S3}$. The directionality of the receiving antenna may not be sufficiently narrow to select one transmission and reject the other. However, as discussed below, the delay processing window of the adaptive delay equalizer or the like (100 microseconds in the present example) is sufficient to process the signals from the two transmitters as well as 20 microseconds or more of multipath delay signals following arrival of the more distant signal transmission. The receiver at location $X_{R4}$ therefore can resolve the two transmission signals.

More specifically, assuming for simplicity that the secondary transmitters all are separated by 120 degrees (the transmitter $T_{S3}$ is 60 degrees above the horizontal in FIG. 5B), the distance between the receiver location $X_{R4}$ and the secondary transmitter $T_{S3}$ can be geometrically calculated as approximately 53.5 miles. Signals propagate from the secondary transmitter $T_{S3}$ to the receiver location $X_{R4}$ in 283.55 microseconds (53.5×5.3). At forty miles from the primary transmitter $T_P$, signals from that transmitter require 212 microseconds to propagate to the receiver location $X_{R4}$. The difference in the arrival time is 71.5 microseconds, which again is within the 100 microsecond delay processing window of the adaptive delay equalizer. The equalizer window also permits processing of multipath signals arriving as much as 28.5 microseconds after the signal from the third secondary transmitter antenna $T_{S3}$.

The preferred embodiments discussed below utilize time domain adaptive equalizers for the delayed signal processing circuits. Adaptive delay equalizers exist for processing large differential delays between received copies of a signal. However, such equalizers currently are not practical for implementation as part of a consumer electronics type device, such as the set-top terminal in a wireless cable system. In accord with the preferred embodiments of the present invention, adaptive delay equalizers are placed in common shared circuitry, serving a large number of customers. As such, the cost of the equalizers is distributed over a large customer base, making use of such equalizers cost effective. In such systems, the shared processing circuitry processes signals from multipath reflections and in some cases from line of sight transmissions from multiple transmitter antennae as discussed above to produce a single enhanced copy of the digital transport stream carried on a selected channel. The equalizer has a delay processing window which is at least as large as the longest delay offset between arrival times of signals from two aligned transmitter antennae. The delay processing window preferably is large enough to compensate for multipath interference from reflections of signals from the more distant transmitter. Typically, an equalizer should be able to process multipath signals having up to a 20 microsecond offset from a directly received source signal.

It will be readily apparent from the above examples that the length of the delay processing window of the equalizer or other type of delayed signal processing circuitry will vary depending on the precise location of the broadcast transmitters. If the transmitters are nearer to each other, then the difference in arrival times is smaller, therefore the delay processing window will be smaller. Similarly, if the transmitters are farther apart from each other, then the difference in arrival times is larger, therefore the delay processing window will should be larger. In systems complying with current MMDS regulations, however, a 100 microsecond delay processing window is adequate for most receiver locations.

Details of a first specific implementation of a broadcast system, shared receiving systems and a set-top terminal device in accord with the present invention are set forth below.

Figure 6:
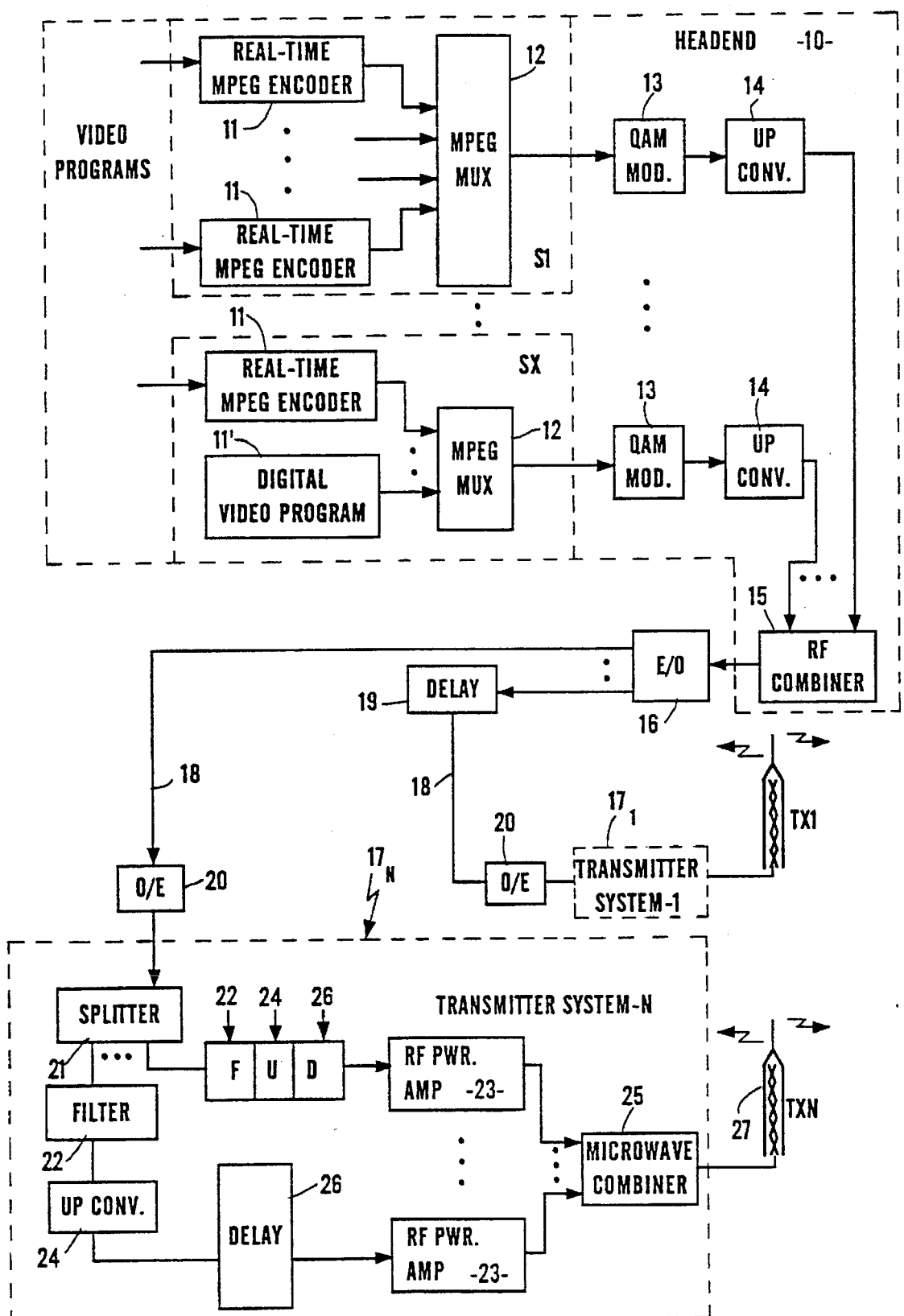
FIG. 6 depicts in functional block diagram form the elements of the transmission system used in accord with the present invention.

The simulcast transmission from the broadcast antennae include a plurality of frequency multiplexed channels. Each channel contains a digital transport stream carrying a number of programs, in compressed digital form. The programs may be audio only programs, or data, but in the preferred embodiments, the programs are television type programs. The television type programs contain video and audio information, and may include data information, e.g. for closed captioning and the like. The system and method for transmitting the simulcast signals and receiving those signals within the service area are now briefly described. With reference to FIG. 6, the broadcasting portion of the system includes a headend 10. The headend includes a number of Sources S1 to SX for producing digital transport streams, each of which contains a plurality of programs encoded as digital, compressed data. The number of such sources corresponds to the number of frequency channels available for use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. The headend 10 therefore typically comprises 20–25 of the Sources S1 to SX, but may include as many as 33 such sources. The Sources S1 to SX may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding. FIG. 6 illustrates the overall architecture of the broadcasting system. As part of the headend 10, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B" frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into approximately 2000 transport packets (4000 packets per second).

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in approximately 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG II standard facilitates time division multiplexing of MPEG packets from a plurality of programs. In the present system, the encoders 11 supply MPEG packets streams for multiple programs to an MPEG multiplexer 12. The number of programs may vary depending on the bandwidth. The MPEG multiplexer 12 may receive digitized and compressed (MPEG) video from other sources 11'. Typical digital sources 11' include digital server (storage) systems and digital video transmission systems (e.g. satellite or optical fiber).

As discussed below, a typical multiplexed digital transport packet stream used in the present invention has 27 Mbits/s of capacity. A mixture of program streams for individual programs at different individual rates, e.g. 1.5 Mbits/s, 3 Mbits/s and 6 Mbits/s, may be combined to fully utilize the 27 Mbits/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel. The other mix of three 6 Mbits/s programs and three 3 Mbits/s programs provides six programs for one RF channel, i.e. a 6 to 1 improvement. Lower bit rates, reduction in overhead requirements and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source.

In a combined MPEG packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the steam with dummy packets to reach the full 27 Mbits/s). The actual stream will include an additional 3 Mbits/s of forward error correction information for a combined rate of 30 Mbits/s, although hereinafter for convenience the bit stream is generally described by its 27 Mbits/s payload rate. The MPEG II standard also requires that a packet stream containing packets relating to one or more programs includes a program association table in a packet identified by PID 0. The program association table maps each program number with the PID value associated with the program map related to that source. In accord with the standard, each MPEG II multiplexer 12 combines MPEG packet streams for the four (or more) input programs and adds a PID 0 packet containing the program association table to the combined stream. In the above example, the program association table would map program number '1' (HBO) with PID value 132 indicating that the program map for HBO is contained in repeating packets identified by PID 132. Similarly, the program association table would map program number '2' (Showtime) with PID value 87 indicating that the program map for Showtime is contained in repeating packets identified by PID 87.

As discussed in more detail below, reception of a particular digital program requires that the CPE terminal device know the RF channel transporting the program and the program number (PN) associated with the program. The decoder uses the information contained in the PID 0 packet to identify the PID value for the program map for the particular desired program, e.g. 132 in the above HBO example, and uses the program map to identify the PID values needed to capture the video, audio and user data (if any) for the desired program.

The 27 Mbits/s (payload) baseband digital output of each MPEG multiplexer 12 from one of the sources S1 to SX goes to a modulator 13. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a cable television type distribution network. The currently preferred implementation uses 64 QAM (quadrature amplitude modulation) or 16 VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s can be modulated into one 6 Mhz bandwidth analog channel. Similarly, 256 QAM or 16 VSB would yield up to 40 Mbits/s payload of capacity (not counting bits added for forward error correction), e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter converts the frequency of the QAM modulated signal up to one of up to thirty-three RF channel frequencies in the 50–450 Mhz range. The upconverter 14 may be an element of the QAM modulator 13 or a separate element as shown hard wired to process the output of the QAM modulator. Each upconverter 14 outputs a different 6 MHz bandwidth RF channel to an RF combiner 15 for combining with the other 6 MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems.

A transmission network supplies the combined spectrum signal in the UHF range from the combiner 15 to a number of transmitter systems $17_1$ to $17_n$. The transmitter systems $17_1$ to $17_n$ correspond to the transmitters TX1 to TX4 described above with respect to FIGS. 4 and 5. Although coaxial cable, wireless microwave relay transmissions or other media could be used, in the preferred embodiment, the transmissions from the headend 10 ride on optical fiber lines 18. In the preferred embodiment, an electrical to optical converter system 16 converts the signal from combiner 15 into optical signals for transmission over a plurality of optical fibers 18. An optical to electrical unit 20 at each transmitter site converts the optical signal back to the combined electrical signal and supplies that signal to one of the transmitter systems.

An important feature of the present invention relates to simulcasting, i.e. substantially simultaneous broadcasting. In the preferred embodiments, the antennae on the transmitter towers TX1, TX2 to TXN simultaneously radiate the combined spectrum UHF signal in-phase. The optical fiber signal transmission from the headend 10 to the transmitter systems requires some finite amount of time. Typically, the transmitter systems will not be equi-distant from the headend. In fact, one of the transmitter systems may be in the same building as the headend. To insure simultaneous broadcasting, the system shown in FIG. 6 therefore includes some form of delay 19 in one or more of the transport lines 18. The delay may take the form of coils of fiber to equalize the optical transport paths and therefore the time through each path. Alternatively, one or more electronic delay devices may be imposed in the relevant paths, either at the headend prior to optical transport or at the respective transmitter location subsequent to conversion back to electrical signal form.

There may be as few as two transmitters. In a typical example, there will be a central transmitter site $T_P$ and two or three other transmitter sites $T_{S1}$, $T_{S2}$ and $T_{S3}$ at various locations about the primary reception area (see e.g. FIGS. 4, 5A and 5B). The headend may be close to the central transmitter site TX1 ($T_P$), therefore the transport distance to that site would be the shortest. Assume now, for example, that TXN (e.g. $T_{S3}$) is the longest distance from the headend. The delay produced by delay device 19 will be equal to the difference in the time required to transport optical signals from the headend to those two sites, i.e. so as to result in simultaneous in-phase transmission of the exact same signal from the antennae at the two transmitters TX1 and TXN. Similar delays are imposed in the lines 18 to the other transmitter systems. Alternatively, at least two transmitters on the periphery may transmit substantially simultaneously, whereas one or more of the other transmitters (e.g. a central transmitter) may transmit a delayed broadcast of the signal.

FIG. 6 also shows details of one transmitter system 17N, by way of an example. Each transmitter system includes a splitter 21. The splitter 21 together with associated channel selection filters 22 divide the received combined signal (50–450 MHz) into its constituent 6 MHz wide RF channels. For each 6 MHz channel in the 50–450 MHz range, one of the upconverters 24 converts that channel into one of the up to thirty-three available (licensed) channels in the UHF microwave range. An RF power amplifier 23 amplifies each UHF channel.

A delay device may process each channel signal, and by way of example, FIG. 6 shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel.

A microwave combiner 25 combines the UHF channel signals back into a combined spectrum signal in the UHF range and supplies that signal to a microwave broadcasting antenna 27. Each transmitting antenna may be an omnidirectional antenna or a directional antenna. The type of antenna at each transmitter site is selected to give the optimum coverage in a particular geographic service area. The antenna 27 emits UHF waves to propagate through a portion of the service area. For each channel, the resultant broadcasts from all of the transmitters are synchronized and in phase with each other. The transmitted microwave signals propagate into substantially overlapping portions of the service area and into some non-overlapping portions of that area, for example in patterns such as shown in FIGS. 4 and 5.

The above discussion of the headend and transmission systems is one example of an overall system for providing the simultaneous, synchronized, in-phase broadcasts from multiple transmitters having substantially overlapping propagation areas. Other headend and transmitter systems could be used. For example, the headend 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to synchronize processing and the resultant broadcast transmissions to some common clock, e.g. from a geo-positioning type satellite system, to achieve the simulcast transmission.

Figure 7:
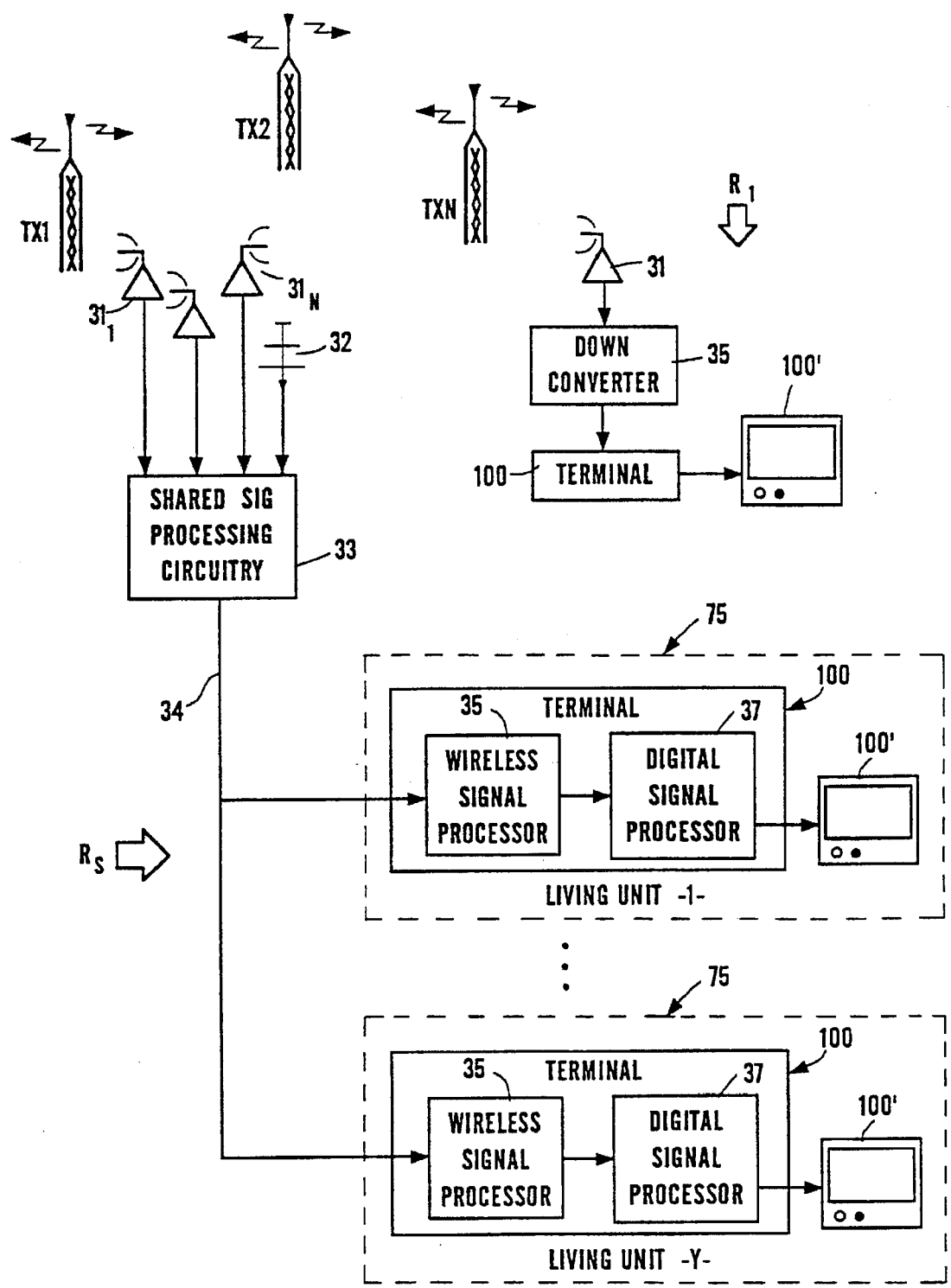
FIG. 7 illustrates the high-level functional elements of a customer premises receiver system and one embodiment of a shared antenna and signal processing system used in accord with the present invention.

FIG. 7 provides a high-level functional diagram of the receiving systems used in the present invention.

In accord with a further aspect of the invention, groups of users or locations, typically in a metropolitan area such as New York City, will have shared receiving systems such as system $R_S$. If at a location such as $X_{R2}$ (FIG. 4) the system typically includes a single directional receiving antenna. At other locations such as $X_{R1}$ (FIG. 4), the receiving system includes a plurality of directional microwave antennae. In the later type of installation, there may be as few as two such receiving antennae aimed at visible ones of the transmitters TX1 to TXN, but preferably the system includes the same number of microwave receiving antennae $31_1$ to $31_N$ as there are transmitters TX1 to TXN serving the particular region. In such a preferred system one of the microwave receiving antennae $31_1$ to $31_N$ is aimed at each of the transmitters TX1 to TXN. This arrangement provides angular diversity in the broadcast waves received through these antennae.

Because of the shared use by multiple customers, the size, gain and quality of the antennae in the shared system can be relatively high. Also, since there is only one antenna or one set of antennae, presumably, the antennae can be placed at one or more sights on community property or on the top of the apartment building were the group of customers reside.

The exemplary shared receiving system $R_S$ illustrated in FIG. 7 is a multiple receiving antenna type system such as would be used at a location such as $X_{R1}$ where the antennae can be aimed at the separate transmitters. The microwave receiving antennae $31_1$ to $31_N$ may be mounted on a relatively high mast to provide clear line-of-sight reception from all of the transmitters serving the region. Alternatively, the antennae $31_1$ to $31_N$ may be located at different vantage points around the development. In a single family home community or in a town house development for example, each individual microwave antenna could be located on a different home, as agreed by the home owners, so as to provide line-of sight reception from the desired one of the transmitters TX1 to TXN. For example, one home at one end of the development may have a clear line-of-sight to one transmitter tower, a second home at the other end of the development may have a clear line-of-sight of the second transmitter, etc. Antennae located on those homes are connected to the shared processing circuitry 33. On an apartment or hotel building, each individual antenna could be located at a different one of the corners of the building, so as to provide the necessary line-of sight reception from the desired one of the transmitters TX1 to TXN.

The shared receiving system $R_S$ also includes a television antenna 32 for reception of standard off-the-air transmissions in the normal VHF and UHF television channel frequencies. Signals from the microwave receiving antennae $31_1$ to $31_N$ and the television antenna 32 all go to shared signal processing circuitry 33. The shared signal processing circuitry 33 processes the signals from the microwave receiving antennae $31_1$ to $31_N$ to produce a single high quality RF spectrum signal in at least a portion of the 50–450 MHz range from the microwave transmissions. Of particular note, the shared signal processing circuitry includes a time delay equalizer or the like for processing the directly received signals and multipath reflected signals from the various transmitters for each of the microwave channels. The shared signal processing circuitry 33 combines the processed and downconverted multi-channel RF spectrum signal with off-the-air analog video channel signals from the antenna 32.

The channels received by microwave transmission may be interleaved into RF channels having no corresponding off-the-air transmissions. For example, in an area having off-the-air transmissions on channels 5, 7 and 9 the circuitry 33 would place some of the microwave transmitted channel information into channels 6, 8 and 10. Alternatively, the off-the-air channels may simply occupy the lower portion of the output bandwidth, e.g. 50–225 MHz, then the shared signal processing circuitry 33 places the microwave transmitted channel information into channels in the 225–450 MHz range and combines the signals together. An exemplary system for use as the shared signal processing circuitry 33 is discussed below with regard to FIGS. 7A and 7B.

The shared signal processing circuitry 33 outputs the processed channel signals through a distribution network to some number Y of individual living units 75. A variety of distribution networks may be used, including a wireless system as described in the above incorporated 08/409,574 (680-130A) application. In the example shown in FIG. 7, the distribution network takes the form of a wired system, preferably a coaxial cable network 34. Although not shown, the coaxial cable network would include amplifiers, splitters and taps, as necessary, to supply the signals from the shared processing circuitry 33 to however many of the living units the shared system $R_S$ services, in a manner essentially identical to that of a master antenna cable system utilized today in an apartment complex or hotel building.

The distribution network 34 supplies the 50–450 MHz combined spectrum signal to one or more terminal devices 100 located at various places in each subscriber's living unit 75. Each terminal 100 includes some form of wireless signal processor 35 and a digital signal processor 37. The wireless signal processor 35 processes a selected one of the 6 MHz channels to recover the digitally multiplexed transport stream carried in that channel. Each terminal connects to an associated television set 100'. The digital signal processor 37 processes data packets for the selected program from the multiplexed stream to produce signals to drive the TV 100'. The TV 100' presents the program to the viewer in sensorially perceptible form, in this case, as a standard audio/visual output. The television set 100' may also selectively tune off-the-air television channels.

The simulcast transmissions may also service customers not associated with a shared receiving system, such as the system $R_S$. Such other customers will have their own receiving system $R_1$. For example, if such a customer is a home owner, that customer's system $R_1$ would include a small dish type directional antenna 31, a block downconverter 35 and a coaxial distribution system connected to one or more terminals 100 (only one shown).

Typically the antenna 31 is an elliptical dish shaped antenna 18 inches or less in diameter, formed of parallel curved elements. The dish 31 is aimed at the one transmitter TX1 to TXN which produces the strongest received signal through the antenna at the subscriber's particular location. The receiving antenna 31 supplies the 2.1 to 2.7 GHz spectrum (through appropriate filtering and/or amplifiers not shown) to the block downconverter 35.

The block downconverter 35 converts the 2.1 to 2.7 GHz signal, containing all of the RF channels, back down to the video channel band of 50–450 MHz. The block downconverter supplies the 50–450 MHz combined spectrum signal via a coaxial cable to one or more terminal devices 100 located at various places in the subscriber's home. The single residence system may have only one terminal, but in many instances, the signals will be distributed to up to four terminals located throughout the home at desirable television viewing locations.

The terminal 100 in the residential system $R_1$ typically is similar or identical to that used in the shared reception system $R_S$. The terminal 100 in the residential installation will include a time domain adaptive equalizer, although preferably having a much smaller delay processing window than those used in the shared processing circuitry 33. The single residence installation relies much more heavily on angular differentiation between received transmissions by carefully aiming the narrowly directional antenna 31 at one transmitter. The terminal 100 in the living unit 75 serviced by the shared system may include a similar equalizer to eliminate interference effects caused by signal reflections within the cable 34, e.g. from repeater amplifiers and taps (not shown).

In the single residence system $R_1$, as in the shared system $R_S$, the terminal 100 includes some form of wireless signal processor and a digital signal processor. The wireless signal processor processes a selected one of the 6 MHz channels to recover the digitally multiplexed transport stream carried in that channel. The digital signal processor processes data packets for the selected program from the multiplexed stream to produce signals to drive the TV 100'. The TV 100' presents the program to the viewer in sensorially perceptible form, again as a standard audio/visual output.

Figure 7A:
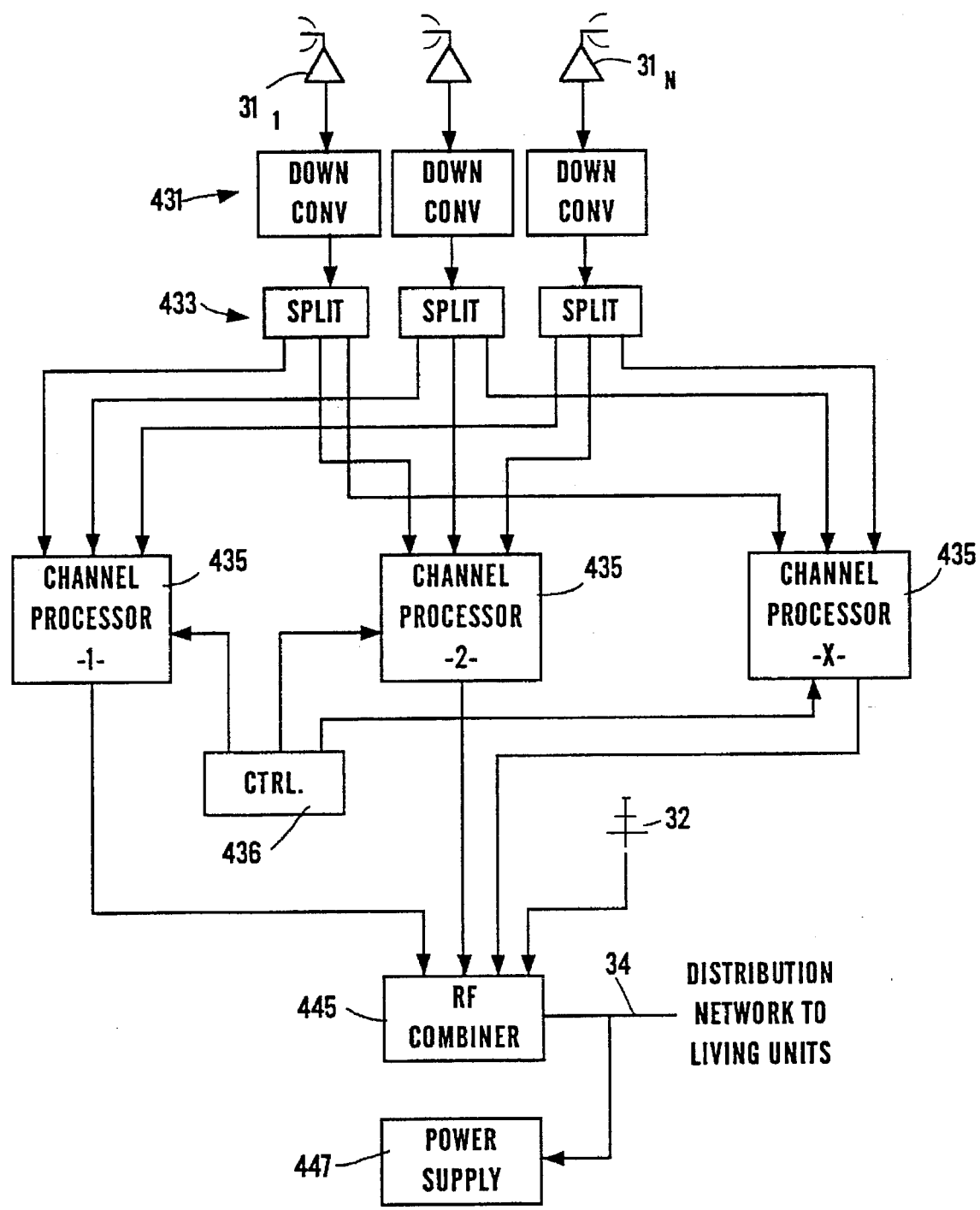
FIGS. 7A is a functional diagram of the shared signal processing circuitry used in the shared receiving system illustrated in FIG. 7.

FIG. 7A shows an example of the shared signal processing circuitry for use in the shared reception system $R_S$ depicted in FIG. 7.

As shown, the shared circuitry includes a block downconverter 431 connected to each of the receiving antennae $31_1$ to $31_N$. Each downconverter 431 converts the 2.1 to 2.7 GHz signal, containing all of the microwave digital transport channels, back down to the video channel band of 50–450 MHz. Each block downconverter 431 supplies the 50–450 MHz combined spectrum signal from one of the antennae $31_1$ to $31_N$ to a splitter 433. Each splitter splits and amplifies the respective antenna signal as necessary to supply a copy thereof to each of a plurality (X) of channel processors 435. It will be apparent that if the system $R_S$ includes only one receiving antenna, then the shared circuitry 33 includes only one down converter 431 and only one splitter 433.

There is one channel processor 435 for each of the RF channels carrying the digital multiplexed program streams. Each of the channel processors 435 processes the signals in one RF channel frequency band from the one or more antennae 31 to produce an enhanced representation of the signal for one channel. In particular, the channel processors each include some form of delay signal processing circuitry to derive a single accurate representation of the channel signal from the multiplicity of delayed copies thereof included in the signals from the one or more antennae 31.

The shared processing circuitry includes a controller 436. The controller 436 controls at least some functions of each of the channel processors 435, for example the decryption of the individual channel signals.

The channels processors 435 each output one enhanced signal for one RF channel in the 50–450 MHz range. The channel processors supply the enhanced channel signals to an RF combiner 445. The RF combiner 445 receives the optimum signal for each channel as processed by the respective processor 435 and combines all of the optimum channel signals into a single combined spectrum output signal.

The RF combiner 445 also receives the off-the-air channel signals from the antenna 32. The combiner combines channel signals from the antenna 32 into the combined spectrum signal in the 50–450 MHz range together with the selected RF channel signals output by channel processors 435, in one of the ways discussed above with regard to FIG. 7. The RF combiner 445 supplies the combined signal through the coaxial cable distribution network 34 to the terminal devices in the various living units.

The shared signal processing circuitry shown in FIG. 7A may receive power via the coaxial cable distribution network 34. In such a case, the circuitry includes a power supply 447 connected to the cable network 34. The power supply 447 provides all necessary power to the operating elements within the shared signal processing circuitry 33. The power supply 447 is essentially the same as supplies used in cable television systems.

Figure 7B:
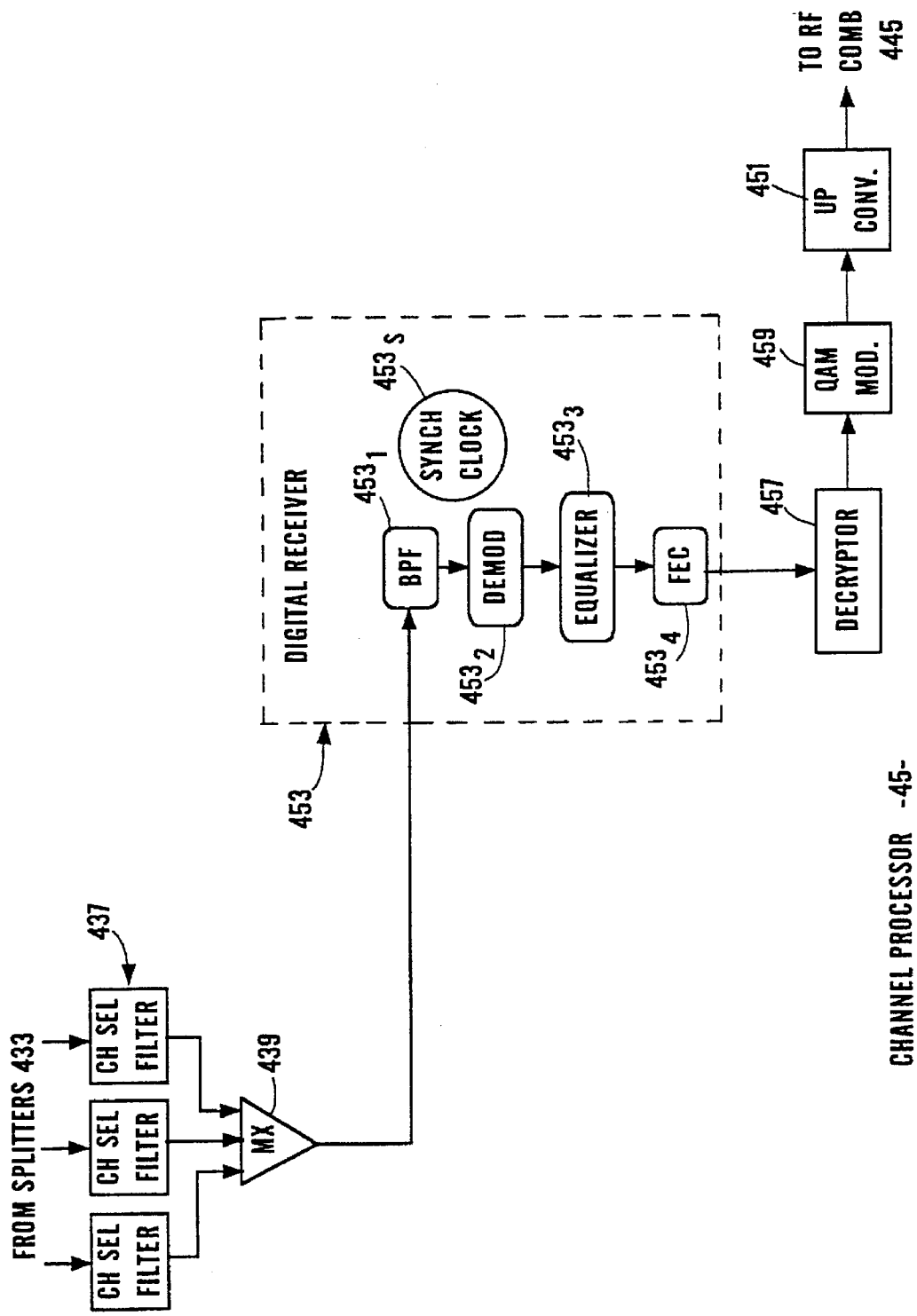
FIG. 7B is a more detailed functional diagram of an example of a channel processor used in the circuitry of FIG. 7A.

FIG. 7B shows the structure of one of the channel processors 435 in block diagram form. As shown, each channel processor 435 includes a bank of channel selection filters 437. Specifically, the bank includes one channel selection filter for each antenna signal. If the shared system $R_S$ includes only one receiving antenna 31, the processors 435 each include a single filter 437. In the first channel processor -1-, for example, the channel selection filters 437 all select a predetermined first one of the 6 MHz channels in the 50–450 MHz range carrying a digital multiplexed transport stream, e.g. a channel corresponding to TV channel 2; the filters 437 in the second channel processor -2- select a second RF channel carrying digital information, e.g. a channel corresponding to TV channel 4; etc. Within the Channel processors 435, each of the channel selection filters 437 provides a single RF channel signal received through one of the microwave antennae $31_1$ to $31_N$ to one input of an RF mixer 439.

The RF mixer 439 supplies the combined signal for the selected channel bandwidth from all of the antennae to a digital receiver 453. In view of the direction of the multiple antennae $31_1$ to $31_N$ at the different transmitters, the signals from the mixer 439 will include a plurality of direct reception signals as well as multipath reflection signals from a plurality of the source transmitters.

As noted above, the shared receiving system may in some installations include only one receiving antenna. In such a case, each channel processor would include only one of the channel selection filters 437, and that one filter 437 would supply the selected channel bandwidth signal to the digital receiver 453. In at least some installations, for example at a location such as $X_{R2}$ (FIG. 4), the receiving antenna is aligned with two or more of the transmitting antennae. In such a case, the signal from the one channel selection filter 437 would still include a plurality of direct reception signals as well as multipath reflection signals from a plurality of the source transmitters. If the single antenna is narrowly directed toward a single transmitter, the signal from the channel selection filter 437 would include only one direct reception signal but would still include multipath reflection signals from one or more of the source transmitters.

The digital receiver 453 includes a band-pass filter $453_1$, a demodulator $453_2$ (e.g. 64 QAM), a time domain adaptive digital equalizer $453_3$, and forward error correction circuitry $453_4$. A clock circuit $453_5$ provides synchronization for the digital output of the demodulator, the adaptive digital equalizer, and the forward error correction circuitry. The digital receiver 453 outputs an accurate representation of the transport stream from the channel selected by the filter(s) 437.

The time domain adaptive digital equalizer $453_3$ receives the output of the QAM demodulator $453_2$. Because of the multi-path delays and/or offset arrival of the overlapping transmissions from separately located multiple transmitter sites, the output of the demodulator will not be a clean digital pulse stream. Instead, the signal will be a composite of time delayed copies of the transmitted digital information. The time domain adaptive equalizer $453_3$ includes a multi-tap digital delay line, the length of which defines the time window of the delay equalizer. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. If the broadcast system utilizes spread spectrum transmissions, then the filter, demodulator and equalizer would be replaced with the spread spectrum processing circuitry and rake receiver. The forward error correction circuit $453_4$ processes the recaptured symbols (e.g. 1s and 0s) to determine if each is in the proper position in the stream.

The preferred embodiments illustrated in the drawings utilize delay equalizers in the channel processors 435. As noted, the length of the digital delay line in equalizer $453_3$ and the number of taps off of the digital delay line determine the delay processing window of the equalizer. In accord with the present invention, the precise window of the equalizer (or spread spectrum demodulator and rake receiver) is selected to compensate for the longest delay interval between different transmitters that may be aligned to transmit signals directly to a single receiving location. In the preferred embodiment, the delay window is longer than this maximum delay by some amount chosen to permit processing of multipath delayed signals from the more distant transmitter.

In the single receiving antenna examples discussed above relative to FIGS. 4, 5A and 5B, it was tacitly assumed that because of the directionality of the receiving antennae and the blockage of the back lobes from the secondary transmitters, virtually all receiving antennae will align with at most the primary transmission and one secondary transmission from an antenna which appears to the receiving to be behind the primary antenna. The maximum delay differential between signals received from aligned transmitter antennae therefore equals the time of propagation from the most distant secondary antenna to the location of the primary antenna. In the examples, the most distant secondary antenna is 15 miles from the primary antenna $T_P$, therefore the propagation time is 79.5 microseconds. The equalizer processing window was chosen to provide an additional 20 microseconds, to permit processing of multipath delayed signals from the distant secondary antenna, therefore the preferred delay equalizer $453_3$ in the single receiving antenna aligned with two transmitter examples had a delay processing window of 100 microseconds.

In installations having multiple receiving antennae, however, the antennae may actually align with all of the transmitters. The signal supplied to the delay equalizer $453_3$ (or rake receiver) in such an installation would have a processing window chosen to compensate for the longest differential arrival time for direct transmissions plus some amount of additional multipath delay. Recall now the above discussed example regarding receiver receiving location $X_{R1}$ (FIG. 4). It was assumed for that example that $X_{R1}$ is half way between transmitter antennae $T_P$ and $T_{S1}$ and that the secondary transmitters all are separated by 120 degrees (the transmitter $T_{S2}$ is 60 degrees below the horizontal in FIG. 4 and the transmitter $T_{S3}$ is 60 degrees above the horizontal in FIG. 4). Thus, the distance between the receiver location $X_{R1}$ and the each of the secondary transmitters $T_{S2}$ and $T_{S3}$ is approximately 19.84 miles. Electromagnetic waves propagate through atmosphere at a rate of approximately 5.3 microseconds per mile. Consequently, the transmission from each of the secondary antennae $T_{S2}$ and $T_{S3}$ arrives at the receiver location $X_{R1}$ approximately 105.15 microseconds after transmission thereof. The transmission from each of the transmitter antennae $T_P$ and $T_{S1}$ 39.75 microseconds after the simultaneous transmission. The difference in propagation times is 65.40 microseconds. At such a location, the delay equalizer $453_3$ (or the rake processor) would have a delay processing window of at least 85 microseconds which allows approximately an additional 20 microseconds for processing multipath delayed copies of the signals from the most distant secondary transmitters $T_{S2}$ and $T_{S3}$. In most of the preferred embodiments using a delay equalizer in a service area of the approximate dimensions shown in FIG. 4, the processing window of the delay processing circuit is 100 microseconds.

In another example discussed above relative to FIG. 4, the receiver location was considered as adjacent to one of the secondary transmitters, for example, the transmitter $T_{S2}$. Signals from that transmitter would reach the receiving location almost instantaneously. Signals from the primary transmitter antenna $T_P$ would reach that location after 79.5 microseconds (15×5.3). The distance between the receiver location and each of the secondary transmitters $T_{S1}$ and $T_{S3}$ was geometrically calculated as 25.97 miles. Propagation of the signals transmitted from the secondary transmitters $T_{S1}$ and $T_{S3}$ to this exemplary receiver location requires approximately 137.64 (25.97×5.3) microseconds. The time difference between the first arriving copy of the signal (from transmitter $T_{S2}$) and the copy of the signal from the most distant transmitters $T_{S1}$ and $T_{S3}$ is 137.64 microseconds.

If a shared receiving system located adjacent to transmitter $T_{S2}$ includes receiving antennae directed at all four of the transmitters, the equalizer $453_3$ or the like should have a processing window of 155 to 160 microseconds (137.64 plus approximately 20 microseconds). However, as discussed above, the system can utilize delay processing circuitry having a somewhat smaller window by aiming a smaller number of directional receiving antennae at a smaller subset of the broadcast transmitters. For example, if the receiving system includes only two receiving antennae, one aimed at the adjacent transmitter antenna $T_{S2}$ and the other aimed at the primary transmitter antenna $T_P$, then the difference in direct propagation times is 79.5. As an alternative example, the receiving system might include three receiving antenna, one aimed at the primary transmitter antenna $T_P$, and each of the other two aimed at one of the secondary transmitter antennae $T_{S1}$ and $T_{S3}$. In this example with no direct reception from the adjacent antenna $T_{S2}$, the difference in direct propagation times is 58.14 (137.64–79.5) microseconds. A delay equalizer $453_3$ having a processing window in the range of 100 microseconds could readily process such signals as wells as multipath signals from the limited number of transmitters in either of these two alternate installations.

Returning to FIG. 7B, the digital receiver 453 outputs an accurate representation of the transport stream (27 Mbits/s payload only) from the channel selected by the filter(s) 437. At this point, the delay equalizer or the like has eliminated all effects of reception of multiple time offset copies of the transmitted channel signal, and the forward error correction circuitry has eliminated errors caused by the wireless broadcast transmission. The digital receiver 453 may supply the transport stream to an optional decryptor 457 or directly to another QAM modulator 459.

If included, the decryptor 457 controls access to digital broadcast services. The decryptor 457 comprises a decryption processing circuit and an interface to the controller 436. The controller 436 (FIG. 7) controls operation of at least the decryptor 457 through an appropriate interface (not shown). When properly authorized, the decryptor 457 decrypts payload data within packets of the individual programs in the transport stream from the particular channel selected by the filter(s) 437. The composite MPEG transport multiplex with decrypted components for all of the individual programs goes to the QAM modulator 459.

A forward error correction circuit (not shown), similar to that used in the MPEG multiplexers 12, preferably is associated with the input to the QAM modulator 459. In the present embodiment, this circuit would add approximately 3 Mbits/s of new forward error correction information to the transport stream before modulation thereof by the QAM modulator 459. The modulator 459 is identical to the modulators 13 and serves to modulate the transport stream (now 30 Mbits/s with forward error correction information) into an intermediate frequency signal.

In each channel processor 435, a modulator 459 outputs the intermediate frequency signal to an individual upconverter 451. The upconverter 451 is identical to one of the upconverters 14 discussed above. The upconverter 451 converts the frequency of the QAM modulated signal up to one of up to thirty-three RF channel frequencies in the 50–450 Mhz range. The upconverter 451 may be an element of the QAM modulator 459 or a separate element as shown hard wired to process the output of the QAM modulator. Each upconverter 451 outputs a different 6 MHz bandwidth RF channel to the RF combiner 445 for combining with the other 6 MHz RF signals from the other channel processors 435 and off-the air channel signals from antenna 32. The RF combiner 445 thereafter outputs the combined RF signals in the normal video channel range of approximately 50–450 Mhz. The upconverters 14 and the RF combiner 15 may be the same as components currently used for RF signal processing in cable television systems.

A control interface (not shown in FIG. 7B) provides appropriate control signals elements of the channel processor 453 from the controller 436. The functions of the channel selection filter and the digital receiver tend to be relatively static over time and require relatively litter dynamic control. If included, the decryptor 457 would require more dynamic control as the broadcast headend changes encryption codes for individual programs over time.

From the above discussion of the shared processing circuitry it should be apparent that the signal on the on-premises cable system 34 comprises a plurality of frequency multiplexed RF channels in the 50–450 MHz range. At least certain RF channels carry digital transport streams. Each digital transport stream comprises a plurality of time division multiplexed program signals, in MPEG II digitized and compressed form. To further understand this first preferred embodiment of the invention, it will be helpful now to discuss the structure and operation of the terminal devices 100 for processing and presenting information from the channels on cable network 34.

Figure 8:
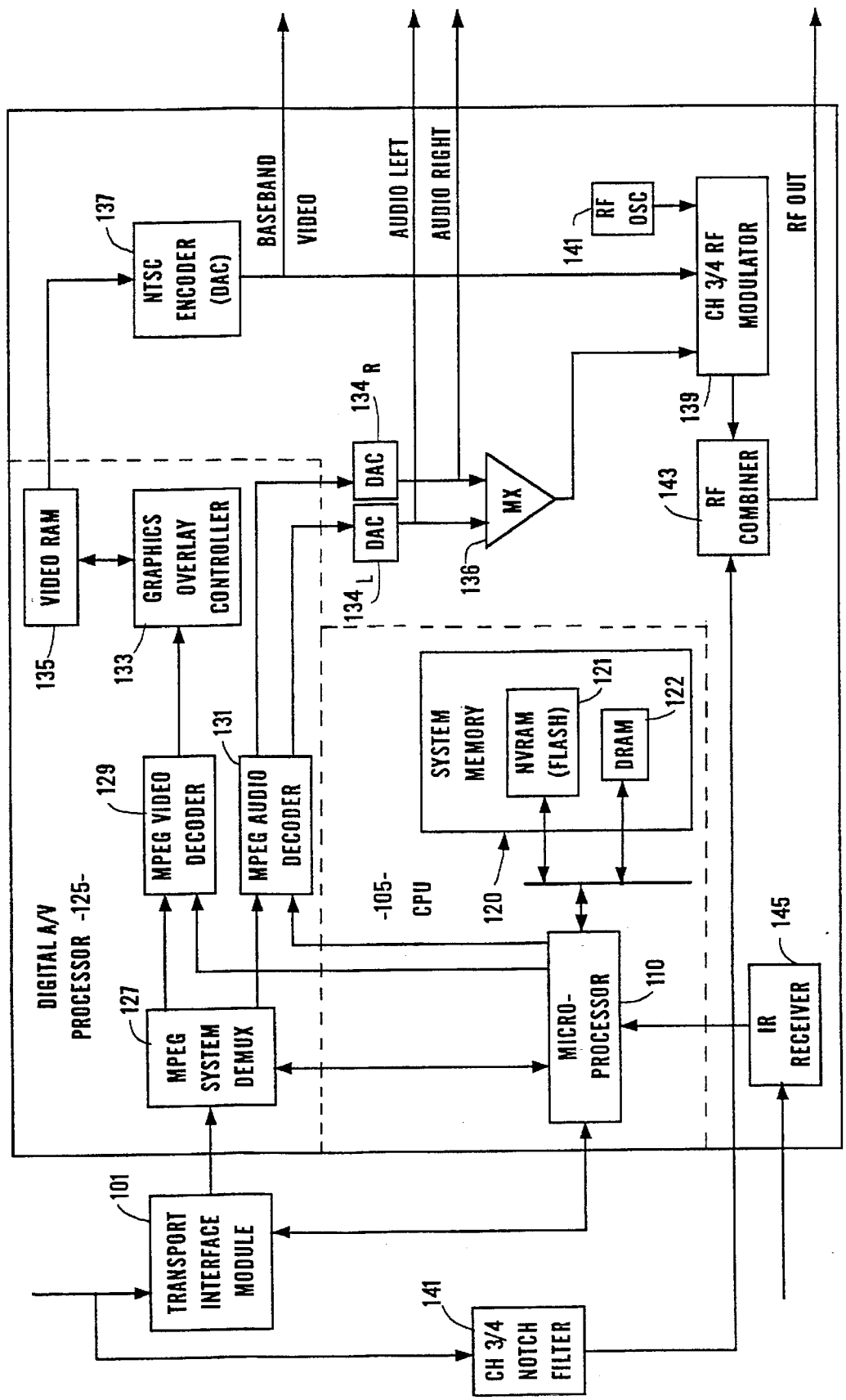
FIG. 8 illustrates in block diagram form the elements of one terminal device used in the system of FIG. 7.

FIG. 8 illustrates the functional elements of the terminal 100 for use in a single residence system $R_1$ and preferably in the first embodiment of the shared receiving system $R_S$. In this embodiment the terminal 100 is a digital entertainment terminal, or 'DET.' The DET 100 will include a transport interface module (TIM) 101 providing the actual physical connection to the coaxial cable network in the subscriber's premises. The transport interface module (TIM) 101 will also perform the format conversion necessary between signal formats utilized by the network and signal formats used within the digital processing portion of the DET 100. In the present invention, the TIM performs RF tuning and QAM demodulation. If the programming is encrypted, the TIM may also include the necessary decryption circuitry. The TIM 101 therefore serves as the wireless signal processor 35. The main portion of the DET 100 serves as the digital signal processor 37.

In the illustrated embodiment, the transport interface module (TIM) 101 presents two connections to the rest of the DET, a high bit rate broadband connection for received broadband signals and a low bit rate signaling connection to permit control and monitoring of the TIM by a microprocessor within the main portion of the DET. For a selected channel, the TIM hands off the 27 Mbits/s baseband digital transport stream captured from that RF channel to the main portion of the DET. The structure of the TIM 101 is described in more detail below with regard to FIG. 9.

The DET 100 includes a CPU 105, comprising a 386, 486 or Pentium microprocessor 110 and associated system memory 120. The system memory 120 includes volatile dynamic RAM 122 and non-volatile RAM 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 134.

The MPEG system demultiplexer circuitry 127 recognizes packets in the MPEG data stream received over the broadband channel through the transport interface module (TIM) 101 and routes the payload information from packets having predetermined PID values to the appropriate components of the DET. For example, under CPU control, the MPEG system demultiplexer circuitry 127 recognizes audio and video packets in the MPEG data stream as audio and video relating to a selected program and routes payload data from those packets to the decoders 129, 131, respectively. The MPEG system demultiplexer circuitry 127 routes packets having specified PID values identified as user data packets to the CPU 105 for further processing. The MPEG system demultiplexer circuitry 127 recognizes program map packets (and program association packets if necessary) and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 134 is not a specialized "video RAM" as that term is sometimes used in the television art. The RAM 134 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as information included as user data in the MPEG packet streams, in response to instructions from the CPU 105. The video RAM 134 sequentially receives each frame of digitized, uncompressed video information, as output from the MPEG video decoder 129. The video RAM 134 also receives digital information and read/write control signals from the graphics overlay controller 133 representing the several planes of text and graphics information and combines that information with the frames of decompressed video to produce composite video frames.

The graphics overlay controller 133 and the video RAM 134 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 134, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Figure 1:
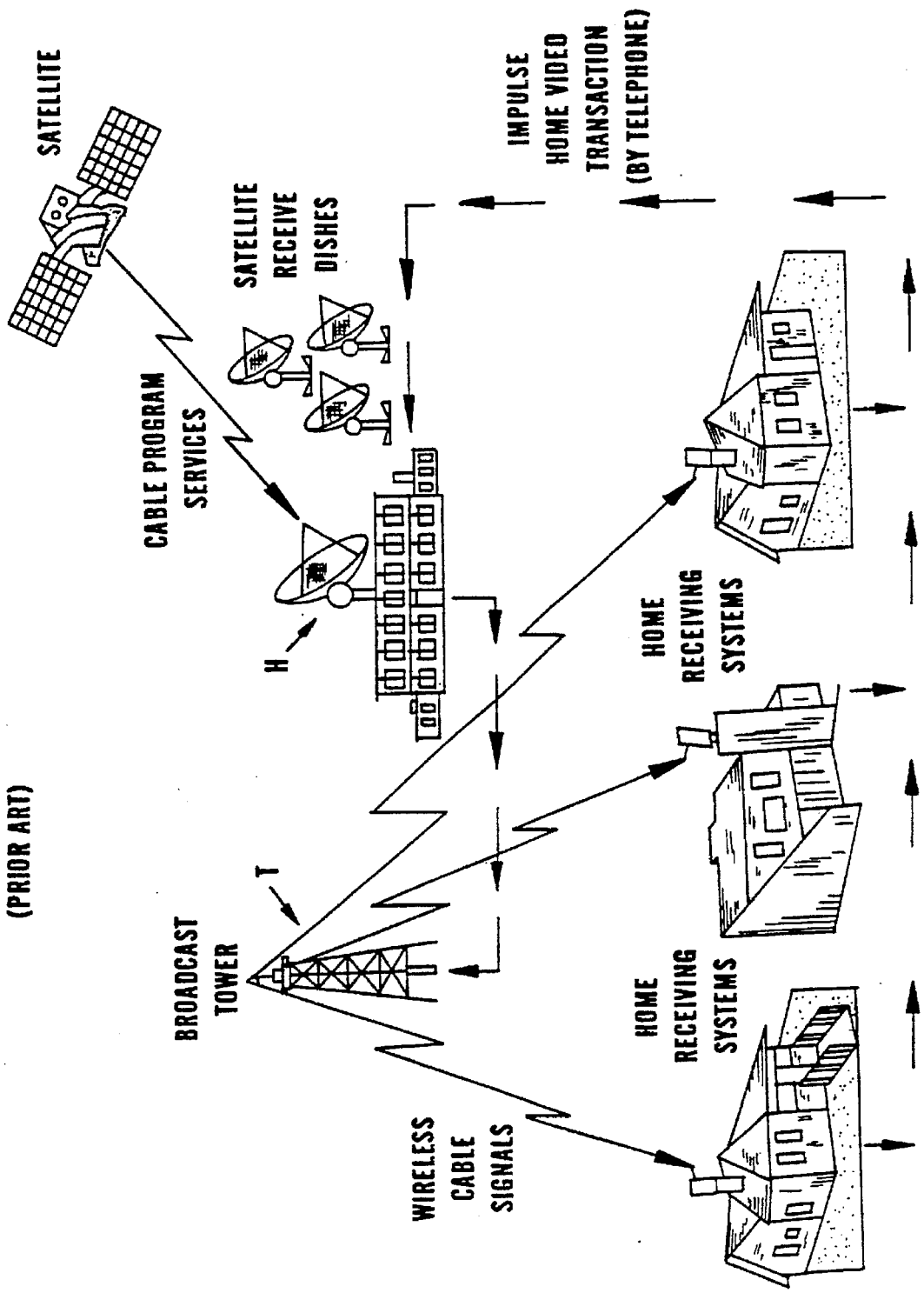
FIG. 1 is a simplified diagram of a prior art wireless cable television system.
Figure 1A:
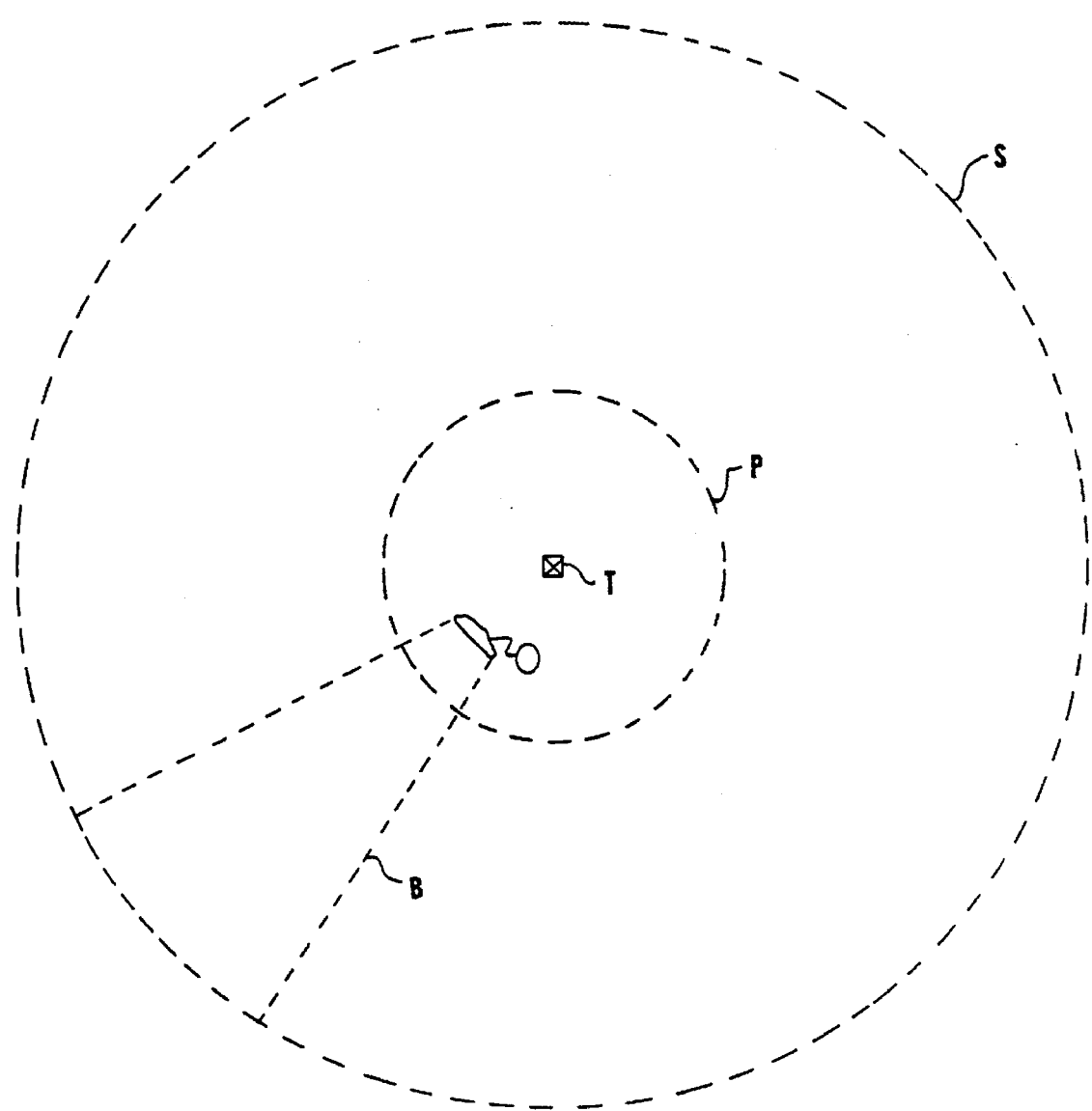
FIG. 1A shows service areas relating to a single wireless transmitter in the system of FIG. 1.

Each DET also includes means to receive selection signals from a user. In the embodiment illustrated in FIG. 1, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on applications programming and/or operating system software stored in the system memory 120. For example, in response to certain input commands, the microprocessor 110 may control a cursor position and display received user data in the form of alphanumeric information displayed as graphics and text on the associated television set 100'. The microprocessor 110 will also respond to an appropriate input command from the user to select a broadcast program as discussed in more detail below.

Figure 9:
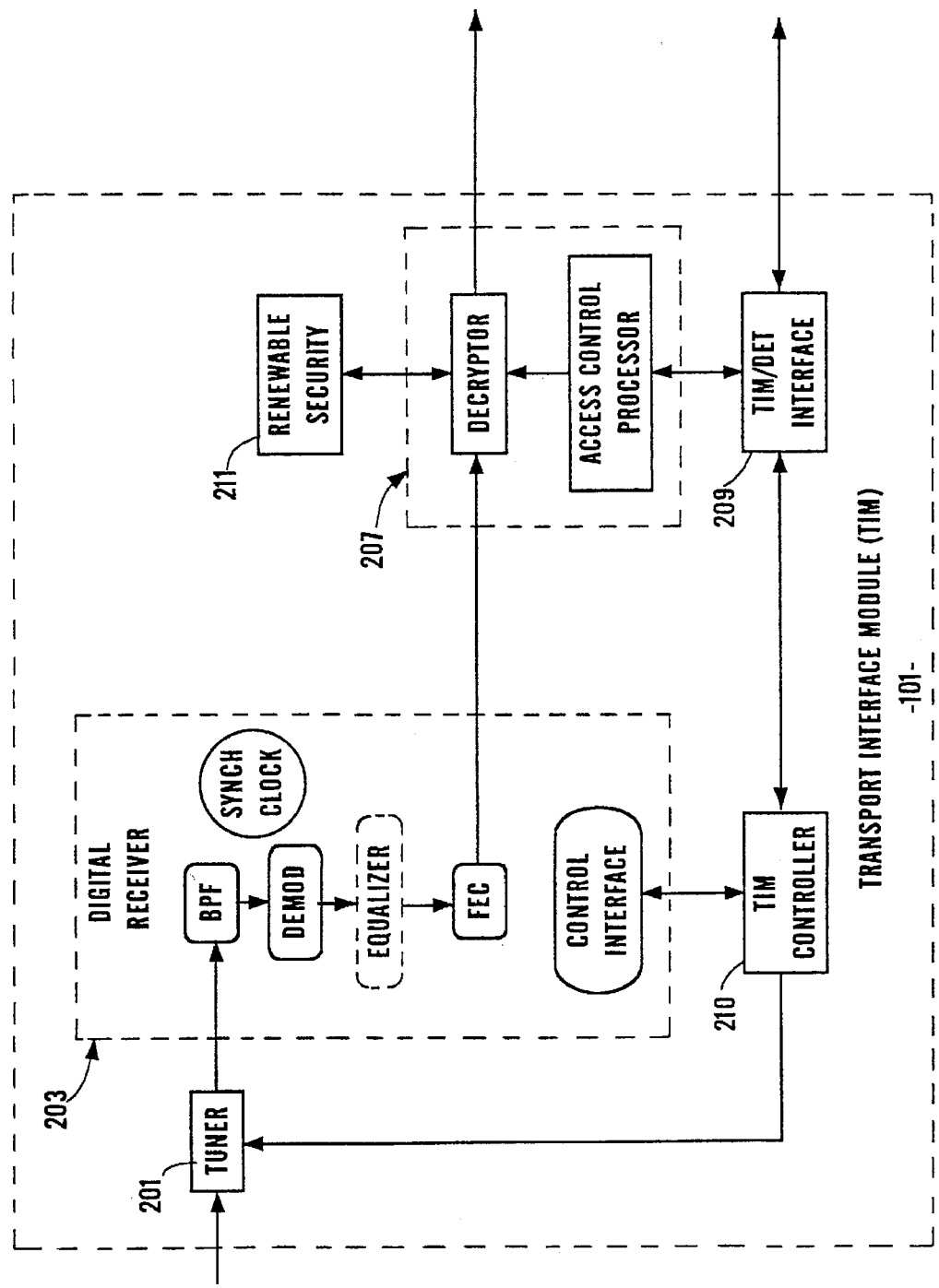
FIG. 9 is a block diagram illustration of the elements of a transport interface module used in the terminal of FIG. 8.

FIG. 9 depicts in block diagram form the structure of a TIM 101. The structure illustrated is based in part on the current preference for the 64 QAM modulation techniques for the digital video signals in transmission system of the type shown in FIG. 6. The input to the TIM is a broadband RF signal in the 50–450 MHz range provided from a coaxial cable from the down converter. The tuner 201 selects a specific 6 MHz channel from the broadband input spectrum and presents it at an intermediate frequency to the digital communications receiver section 203.

The digital receiver 203 includes a low-pass filter, a demodulator (e.g. 64 QAM), an optional time domain adaptive digital equalizer, and forward error correction circuitry. A clock circuit provides synchronization for the digital output of the demodulator, the adaptive digital equalizer, and the forward error correction circuitry.

If included, the time domain adaptive digital equalizer receives the output of the QAM demodulator. Typically, the time domain adaptive equalizer is included in the TIM 101 in private residential installations $R_1$. In such an installation, the equalizer in the TIM functions in the same manner as an equalizer $453_3$ in the shared processing circuitry 33. However, preferably the single residence installation includes a single receiving antenna 31 narrowly aimed at a single transmitter, therefore the delay processing window can be much smaller than that used in the shared processing circuitry 33. In a shared receiving system $R_S$ serving a large number of living units 75, the cable network 34 will include repeater amplifiers, bridges and taps (not shown) such as used in CATV systems. These devices cause signal reflections on the drop cables in the actual living units. These reflection signals are similar to those produced by multipath effects in the wireless environment. In such a system $R_S$, each TIM 101 also would include a delay equalizer, typically having a processing window of about 10 microseconds.

In such installations $R_1$ or $R_S$, the output of the demodulator will not be a clean digital pulse stream. Instead, the signal will be a composite of time delayed copies of the transmitted digital information. The time domain adaptive equalizer includes a multi-tap digital delay line. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. The forward error correction circuit processes the recaptured symbols (e.g. 1s and 0s) to determine if each is in the proper position in the stream.

A control interface provides appropriate control signals to the elements of the digital receiver 207 in response to instructions from the transport interface module (TIM) controller 210. The digital receiver processes signals selected from one of the RF channels by operation of the tuner 210 to capture one of the digital transport streams (e.g. 27 Mbits/s payload assuming 64 QAM). The digital processor outputs the transport stream as a corrected serial baseband digital feed.

A decryption module 207 is optional. In a single residence system $R_1$, the TIM 101 typically includes this module 207. In the preferred implementation of the shared system $R_S$, the digital receivers 453 include decryptors, but decryptors could be provided in the TIMs. If included in the TIM 101, this module 207 controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. When properly authorized, the decryptor in module 207 decrypts payload data only in the packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 100' and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map stored in the system memory 120. The microprocessor 110 supplies a message containing the RF channel number and the program number (PN) to the TIM controller 210 via interface 209. In response to the RF channel number, the TIM controller 210 activates the tuner 201 to tune to the identified channel. If the program is still encrypted at the input to the TIM, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the packets of the selected program. As a result, the TIM 216 passes digital signals from the RF channel through the interface to the MPEG system demultiplexer 129 in the main portion of the DET wherein at least the information for the selected program is now in unencrypted form.

The MPEG demultiplexer 127 supplies information from the PID 0 packet, i.e. the program association table to the CPU 105. The microprocessor 110 uses the program number (PN) from the channel map stored in system memory 120 to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129, 131 to begin MPEG decoding of the selected program for presentation to the user via the associated television set 100'.

At least for living units connected to the shared receiving system $R_S$, the DET 100 also includes a selectable channel ¾ notch filter 141 and an RF combiner 143, as shown in FIG. 8. The notch filter connects directly to the coaxial cable network 34. At installation, the user sets a switch selecting either channel 3 or channel 4, and the RF modulator 139 thereafter outputs the standard RF television signal produced from the MPEG processor 125 on the selected TV channel 3 or 4. The switch setting also causes the notch filter 141 to block that signal from the combined RF signal received via the coaxial cable distribution network 34. The notch filter 141, however, passes all other channel signals received via the coaxial cable distribution network 34 through to the RF combiner 143.

The RF combiner combines the selected channel 3 or 4 signal from the modulator 139 together with the other channel signals supplied through the filter 141 and supplies those combined signals to the RF output. If the user connects the RF output to a coaxial cable or antenna lead type RF input to the television set 100', then the user can select any of the off-the-air channels supplied from the antenna 32 through the shared processing circuitry 33 and the distribution network 34 simply by tuning the television set 100' to the appropriate channel. To view the digital programming, the user tunes the television set 100' to channel 3 or activates the display of information received through baseband inputs and then selects the program via the DET 100, in the manner discussed above.

The distribution from the shared signal processing circuitry 33 to the living units 75 may take a number of different forms other than the illustrated coaxial cable network 34. The distribution, for example, may utilize ADSL transport over twisted wire pair as disclosed in commonly assigned patent application Ser. No. 08/233,579 filed Apr. 26, 1994 entitled "Extended Range Video On Demand Distribution System", the disclosure of which is incorporated herein in its entirely by reference. Alternatively, the distribution from the shared system 33 can utilize microwave retransmission as disclosed in the above incorporated parent application Ser. No. 08/409,574. As a further alternative, the shared receiving system 33 may include channel selection circuitry and supply the QAM modulated transport stream for one or more selected RF channels to each living unit over the same twisted wire pair that carries telephone services, as disclosed in U.S. patent application Ser. No. 08/441,977 filed May 16, 1995 entitled "Shared Receiving Systems Utilizing Telephone Cables as Video Drops" (attorney docket no. 680-130B) the disclosure of which is incorporated herein in its entirety by reference.

Figure 10:
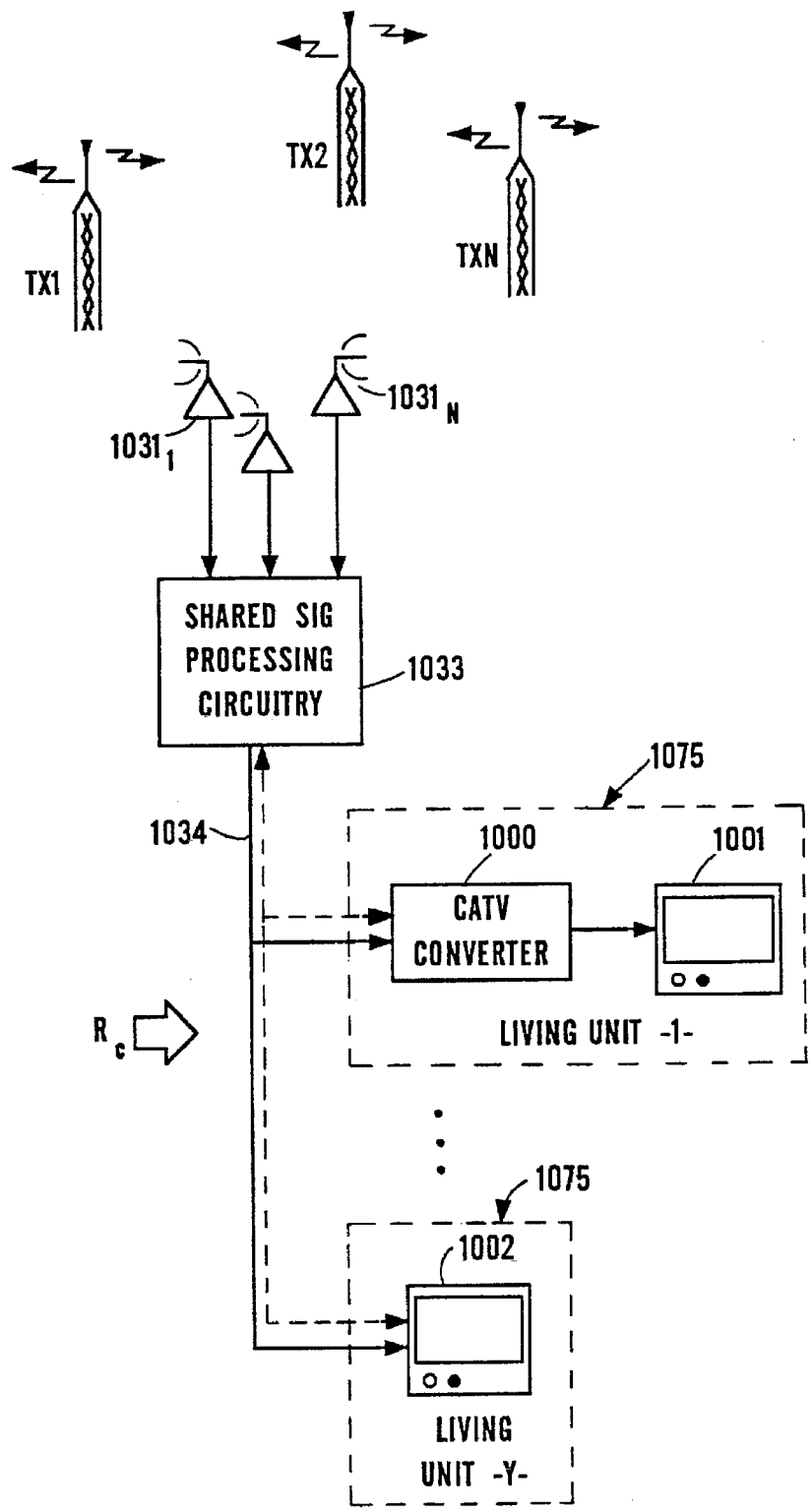
FIG. 10 is a high level functional diagram of a second embodiment of a shared receiving system in accord with the present invention.
Figure 11:
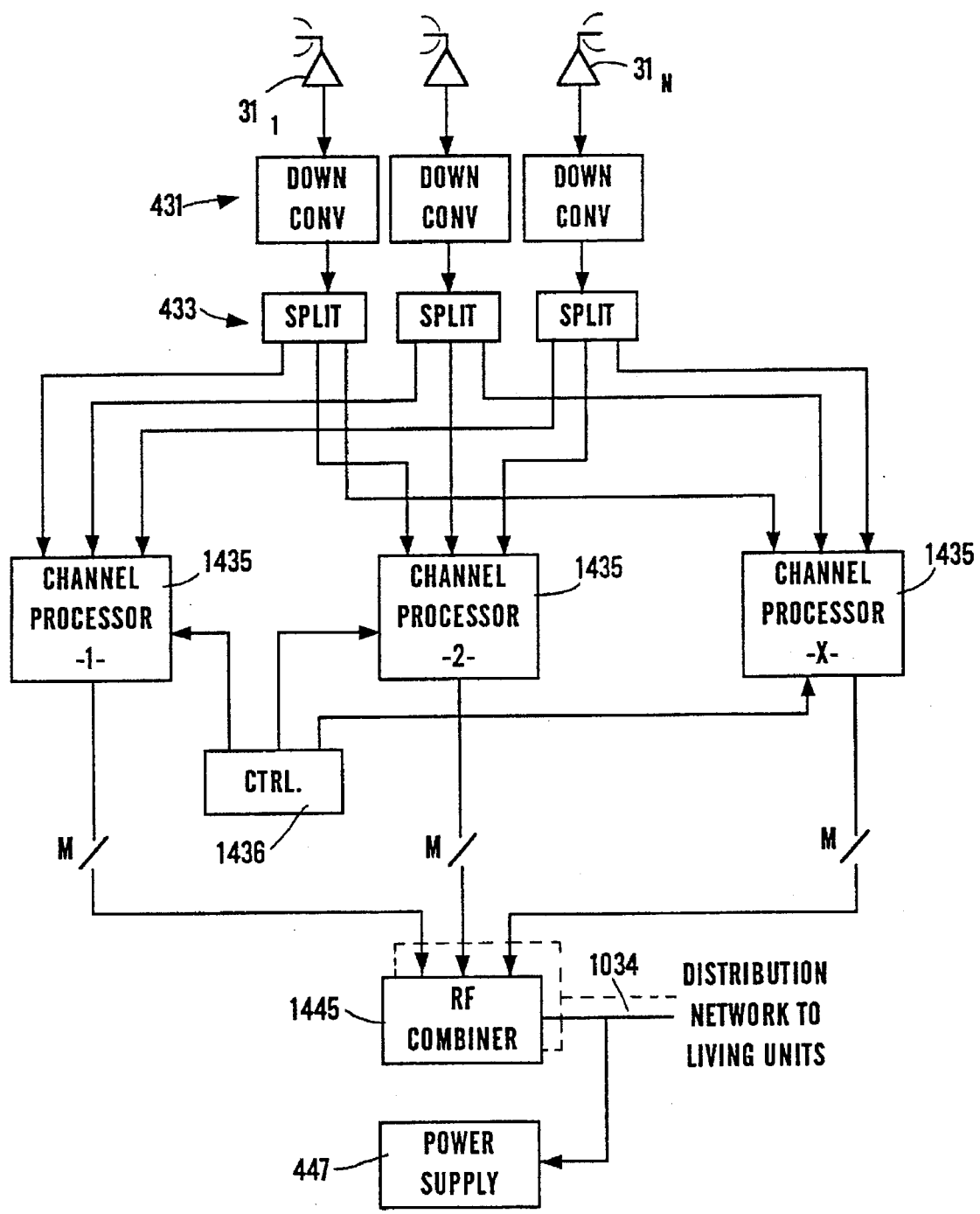
FIG. 11 illustrates the functional elements of the shared signal processing circuitry used in the shared receiving system of FIG. 10.
Figure 12:
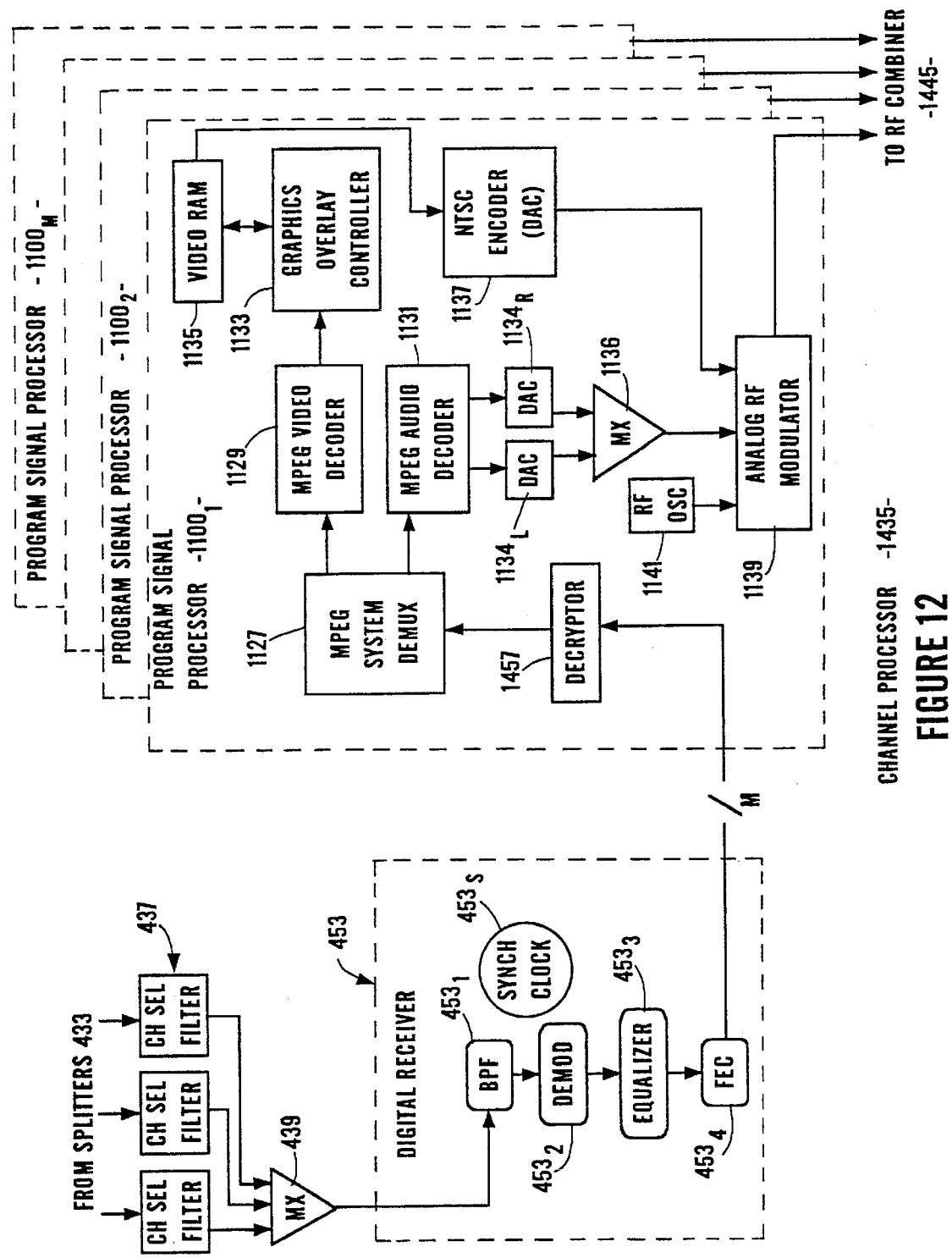
FIGS. 12 illustrates in block diagram form the elements of a channel processor used in the shared circuitry of FIG. 11.

FIGS. 10–12 relate to an alternate embodiment of the shared receiving system in accord with the present invention. In this embodiment, the shared system $R_C$ includes shared signal processing circuitry that converts the received signals into NTSC format video signals, in CATV type RF channels, and distributes the programs to the living units in analog form. Although not shown here for simplicity, the system may process off-the-air analog channels in a manner similar to that in the earlier described shared receiving system $R_S$.

With reference to FIG. 10, the shared receiving system $R_C$ includes at least one and preferably a plurality of directional microwave antennae $31_1$ to $31_N$. A single antenna would be aimed to receive the strongest line of sight transmission. In the illustrated implementation having multiple antennae, there may be as few as two receiving antennae, but preferably the system includes the same number of microwave receiving antennae $31_1$ to $31_N$ as there are transmitters TX1 to TXN serving the region, exactly as in the embodiment of FIG. 7.

The signals from the one or more receiving antennae $31_1$ to $31_N$ go to shared signal processing circuitry 1033. The shared signal processing circuitry 1033 includes delay signal processing circuitry, as in the earlier embodiment, to compensate for reception of delayed copies of signals from multiple transmitters and/or the effects of multipath delay. In this embodiment, the shared signal processing circuitry 1033 also includes digital processing circuitry similar to that in the processors 37 for converting the programs to NTSC analog form. The shared signal processing circuitry 1033 produces one 6 MHz analog RF channel for each of the programs carried on the system. The shared signal processing circuitry 1033 broadcasts those analog channels to the living units 1075 over a local distribution network.

Again, a variety of distribution networks may be used. In the example shown in FIG. 10, the distribution network takes the form of a wired system, preferably a coaxial cable network 1034. Although not shown, the coaxial cable network would include amplifiers and splitters, as necessary, to supply the signals from the shared processing circuitry 1033 to however many of the living units the shared system $R_C$ services, in a manner essentially identical to that of a master antenna cable system utilized today in an apartment or hotel. Depending on the number of programs carried on the system $R_C$, the network 1034 may include two parallel cables (second cable shown in dotted line).

Because the programs on the network 1034 are standard 6 MHz RF television channels, in compliance with the NTSC standard, the subscribers in the living units 1075 can use standard analog CATV type receiving equipment. In one living unit, the equipment might include a CATV converter box 1000 and a television 1. In response to user inputs, the converter 1000 selects a channel from the network 1034 and converts that channel to channel 3 or channel 4. The television 1 continuously selects channel 3 or channel 4 and presents the user with information from program channels from network 1034 selected by the converter 1000. In an alternate implementation, the subscriber's television 1002 is cable ready and performs the channel selection function. Typically, a living unit 1075 will include a number of televisions, some of which may be cable ready and some of which may require use of a CATV converter.

FIG. 11 illustrates the structure of the shared processing circuitry 1033. In general, the high level layout of this shared circuitry is similar to that of the shared circuitry 33 shown in FIG. 7. The key difference relates to the structure of the channel processors 1435 which each output four (or more) analog RF program signals. As in the earlier embodiment, the shared processing system includes one or more downconverters 431 and one or more splitters 433, one downconverter and one splitter processing the signal from each of the one or more antennae 31. Each splitter 433 splits and amplifies the respective antenna signal as necessary to supply the 50–450 MHz combined spectrum signal from one of the antennae $31_1$ to $31_N$ to all of the channel processors 1435.

Under control of controller 1436, each channel processor 1435 processes signals from one of the broadcast RF channels, now in the 50–450 MHz range from the antenna or all of the antennae of the particular shared receiving system $R_C$. As in the earlier embodiment, each channel processor demodulates the RF channel and performs the necessary delayed signal processing. The resultant clean copy of the transport stream from the particular channel is processed to produce four (or more) analog television signals corresponding to the programs carried in the digital transport stream. The channel processors 1435 include a corresponding number of RF channel modulators to modulate the audio and video information of each program onto one CATV type channel, e.g. in the 50–850 MHz range.

The channel processors 1435 supply the resultant analog CATV channels to an RF combiner 1445. Depending on the number of analog programs, the shared system $R_C$ may include two RF combiners. Each RF combiner 1445 receives the optimum signal for each of a plurality of individual program channels, as processed and modulated by the respective processor 1435, and combines all of the received analog CATV channel signals into a single combined spectrum output signal for broadcast via a cable of the network 1034. One of the RF combiners 1445 may also receive and combine in off-the-air channel signals from an off-the-air antenna (not shown), as in the earlier embodiment. The RF combiner 1445 supplies the combined signal through the coaxial cable distribution network 34 to the terminal devices in the various living units 1075.

The shared signal processing circuitry shown in FIG. 11 may receive power via the coaxial cable distribution network 1034. In such a case, the circuitry includes a power supply 447, connected to the cable network 1034, which is identical to the similarly number component in the earlier embodiment.

FIG. 12 shows the structure of one of the channel processors 1435 in block diagram form. As shown, each channel processor 1435 includes a bank of channel selection filters 437 and an RF mixer 439, exactly as in the embodiment of FIG. 7B. The RF mixer 439 supplies the combined signal for the selected channel bandwidth from all of the antennae to a digital receiver 453. In view of the direction of the multiple antennae $31_1$ to $31_N$ at the different transmitters, the signals from the mixer 439 will include a plurality of direct reception signals as well as multipath reflection signals from a plurality of the source transmitters.

If the shared receiving system $R_C$ includes a single receiving antenna, each channel processor 1435 includes only one of the channel selection filters 437, and that one filter 437 would supply the selected channel bandwidth signal to the digital receiver 453. In at least some installations, for example at a location such as $X_{R2}$ (FIG. 4), the receiving antenna is aligned with two or more of the transmitting antennae. In such a case, the signal from the one channel selection filter 437 would still include a plurality of direct reception signals as well as multipath reflection signals from a plurality of the source transmitters. If the single antenna is narrowly directed toward a single transmitter, the signal from the channel selection filter 437 would include only one direct reception signal but would still include multipath reflection signals from one or more of the source transmitters.

The digital receiver 453 includes a band-pass filter $453_1$, a demodulator $453_2$ (e.g. 64 QAM), a time domain adaptive digital equalizer $453_3$, and forward error correction circuitry $453_4$. A clock circuit $453_5$ provides synchronization for the digital output of the demodulator, the adaptive digital equalizer, and the forward error correction circuitry. The digital receiver 453 outputs an accurate representation of the transport stream from the channel selected by the filter(s) 437. The structure and operation of the elements of the digital receiver 453 are identical to those of the similarly numbered components in the embodiment of FIG. 7B.

The digital receiver 453 outputs an accurate representation of the one transport stream from the channel selected by the filter(s) 437. In this embodiment, that transport stream goes to a plurality of program signal processors $1100_1$ to $1100_M$. The number M of these processors will generally correspond to the number of digitized and compressed programs carried in the particular channel, although there may be spare processors for dynamic replacement of a defective processor or dynamic assignment to process a larger number of programs. The precise number may vary between channel processors 1435 if the number of programs differs from channel to channel, e.g. because of differences in program encoding rates. If as in the earlier examples the transport streams from the RF channels all contain four programs encoded at the 6 Mbits/s rate, then the channel processors 1435 will all include four active program signal processors 1100.

Each channel processor 1100 is generally similar in structure and operation, therefore FIG. 12 depicts only the channel processor $1100_1$ in greater detail. Each channel processor includes a decryptor 1457 and a number of components similar to those in the digital processor in the terminal 100 in the earlier embodiment (compare FIG. 8).

The decryptor 1457 controls access to digital broadcast services. The decryptor 1457 comprises a decryption processing circuit and an interface (not shown) to the controller 1436. When properly authorized, the decryptor 1457 decrypts payload data within packets of a selected one of the programs in the transport stream from the digital receiver 453. The composite MPEG transport multiplex with decrypted components for the particular program goes to an MPEG system demultiplexer 1127.

In accord with instructions from the controller 1436 via an interface (not shown), the MPEG system demultiplexer circuitry 127 recognizes packets corresponding to one program in the MPEG transport stream output by the decryptor 1457 based on PID values. Specifically, the demultiplexer 1127 routes the payload information from packets having predetermined PID values to the appropriate decoders. For example, the MPEG system demultiplexer 1127 recognizes audio and video packets in the MPEG data stream as audio and video relating to a predetermined program and routes payload bits from those packets to the decoders 1129, 1131, respectively. The MPEG system demultiplexer 1127 may route information from packets having specified PID values identified as user data packets to the controller 1436 for further processing. The MPEG system demultiplexer circuitry 1127 recognizes program map packets (and program association packets if necessary) and supplies information from those packets to the controller 1436.

The MPEG video decoder 1129 decompresses received video packet signals to produce a digital video signal, and the MPEG audio decoder 1131 decompresses received audio packets to produce left and right digitized stereo signals. The decoders 1129, 1131 are identical to decoders 129, 131 in the terminal 100 (see FIG. 8 and discussion thereof). The decompressed video information goes to a graphics overlay controller 1133 and a video RAM 1135, which correspond to the controller 133 and the RAM 135 in the terminal 100.

The program signal processor 1100 also includes audio and video digital to analog converters and appropriate drivers to produce analog RF signals compatible with CATV type broadcasting to conventional television sets. Specifically, the converter and driver circuitry of the processor 1100₁ includes audio digital to analog converters (DAC's) 1135$_L$, 1135$_R$, an audio mixer 1136, an NTSC encoder 1137, and an RF modulator 1139.

The DAC's 1135$_L$ and 1135$_R$ receive the uncompressed left and right digitized audio signals output by the MPEG audio decoder 1131. In response, the DAC's 1135$_L$ and 1135$_R$ produce baseband analog audio signals. The audio mixer 1136 receives the baseband audio signals from the DAC's 1135$_L$ and 1135$_R$ and combines those analog audio signals to produce a monaural audio signal for input to modulator 1139.

The NTSC encoder 1137 also performs a digital to analog converter (DAC) function. In response to the digitized video output signals from the video RAM 1134, the NTSC encoder 1137 produces a baseband analog video signal in standard NTSC format. The baseband NTSC video signal is supplied to the RF modulator 1139. The RF modulator 1139 responds to the mono audio signal, the NTSC video signal and an RF signal from a local RF oscillator 1141, to produce a standard RF television signal on a predetermined one of the CATV RF channels in the 50–850 MHz range.

If the network 1134 utilizes only one cable, then each program signal processor 1100 outputs an analog RF program signal in a different RF channel and supplies that channel signal to the one RF combiner 1445. If the network 1134 utilizes two cables, then the program signal processors are divided into two separate groups, each group feeding signals for transport on one cable. Within each group, each program signal processor 1100 outputs an analog RF program signal in a different RF channel and supplies that channel signal to the RF combiner 1445 feeding the associated one of the cables.

The above discussion has concentrated on the preferred embodiment which broadcasts video programming. It should be noted, however, that the system may transport other types of programming, such as audio, data and/or telemetry.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

I claim:

1. A system serving a plurality of living units, comprising:
   a shared receiving system, comprising:
   (1) at least one antenna receiving multiple time delayed copies of a signal including multiplexed channels from a plurality of spaced apart transmitters which provide overlapping simultaneous broadcasts of the signal including multiplexed channels, each multiplexed channel containing digitized and compressed broadband information relating to a plurality of programs, and
   (2) a plurality of delay signal processing circuits each responsive to signals from the antenna for processing multiple time delayed copies within a predetermined delay processing window of signals in a respective one of the multiplexed channels, to acquire a single copy of a signal corresponding to the respective one of the multiplexed channels; and
   a plurality of digital processors each responsive to selected digitized and compressed broadband information contained in at least a portion of the acquired single copy for one of the multiplexed channels to present a selected program.

2. A system as in claim 1, wherein the predetermined delay processing window of the delay signal processing circuits has a value equal to or greater than the difference in propagation time to the at least one antenna from two of the spaced apart transmitters.

3. A system as in claim 2, wherein the delay signal processing circuits comprise time delay equalizers.

4. A system as in claim 1, wherein the predetermined delay processing window of the delay signal processing circuits has a value of approximately 100 microseconds.

5. A system as in claim 1, wherein the digital processors are located in the living units and process digitized and compressed broadband information selected by individual users.

6. A system as in claim 1, wherein the digital processors are elements of the shared receiving system.

7. A system serving a plurality of living units, comprising:
   at least one antenna receiving multiple time delayed copies of a signal including multiplexed channels from a plurality of spaced apart transmitters which provide overlapping simultaneous broadcasts of the signal including multiplexed channels, each multiplexed channel containing digitized and compressed broadband information relating to a plurality of programs;
   a plurality of channel selectors coupled to the at least one antenna, each channel selector selecting a respective one of the multiplexed channels;

a plurality of delay signal processing circuits each connected to one of the channel selectors for processing multiple time delayed copies within a predetermined delay processing window of signals in a respective one of the multiplexed channels, to acquire a single copy of a signal corresponding to the respective one of the multiplexed channels; and a network for distributing information from the acquired single copies of the respective channels to the living units for presentation of selected broadband information.

8. A system as in claim 7, further comprising:

a plurality of demodulators, each demodulator demodulating signals from a respective one of the multiplexed channels and supplying the demodulated signals for processing by one of the delay signal processing circuits;

a plurality of modulators for modulating the acquired single copies from the delay processing circuits into separate channels; and a combiner for combining the separate channels into a multiplexed signal containing the separate channels for broadcast via the network.

9. A system as in claim 7, wherein the predetermined delay processing window of the delay signal processing circuits has a value equal to or greater than the difference in propagation time to the at least one antenna from two of the spaced apart transmitters.

10. A system as in claim 9, wherein the predetermined delay processing window of the delay signal processing circuits has a value of approximately 100 microseconds.

11. A system as in claim 9, wherein the delay signal processing circuits comprise time delay equalizers.

12. A system as in claim 7, wherein the multiplexed channels have different frequencies, said system further comprising a plurality of demodulators, each demodulator demodulating selected signals from one of the channel selectors and supplying demodulated signals for processing by one of the delay signal processing circuits.

13. A system as in claim 12, wherein each of the demodulators comprises a QAM demodulator.

14. A system as in claim 12, further comprising:

a plurality of groups of digital processors, each group of digital processors processing the acquired single copy of a signal from one of the delay signal processing circuits, each digital processor processing selected digitized and compressed broadband information corresponding to one program to produce an analog program signal; and a plurality of modulators for modulating the analog program signals for distribution through said network.

15. A system as in claim 14, wherein each digital processor comprises a digital audio/video decoder for decompressing the selected digitized and compressed broadband information to produce a decompressed video signal and a decompressed audio signal.

16. A receiver as in claim 15, wherein:

the selected digitized and compressed broadband information comprises MPEG encoded audio and video packets, and each audio/video decoder comprises:

an MPEG video decoder;

an MPEG audio decoder; and an MPEG demultiplexer selectively routing information from the MPEG encoded video and audio packets carried on the selected channel to the MPEG video decoder and the MPEG audio decoder, respectively.

17. A system as in claim 7, further comprising:

a combiner for multiplexing the acquired copies of signals to form a single optimized representation of said signal including multiplexed channels for distribution via the network;

terminals located in a plurality of the living units, each terminal receiving the single optimized representation of said signal including multiplexed channels and in response thereto presenting information corresponding to a selected one of the programs.

18. A system as in claim 17, wherein each terminal comprises:

(i) an interface module responsive to the single optimized representation of said signal including multiplexed channels for selecting one of the multiplexed channels and acquiring a digital transport stream from the selected channel; and (ii) a digital signal processing section for processing a portion of the acquired digital transport stream associated with a selected program to present information relating to the selected program.

19. A system as in claim 18, wherein each digital signal processing section comprises a digital audio/video decoder for decompressing selected digitized and compressed broadband information to produce a decompressed video signal and a decompressed audio signal.

20. A receiver as in claim 19, wherein:

the selected digitized and compressed broadband information comprises MPEG encoded audio and video packets, and each audio/video decoder comprises:

an MPEG video decoder;

an MPEG audio decoder; and an MPEG demultiplexer selectively routing information from the MPEG encoded video and audio packets carried on the digital transport stream to the MPEG video decoder and the MPEG audio decoder, respectively.

21. A system as in claim 18, wherein each digital signal processing section comprises driver circuitry for presenting information to a user via a video output device.

22. A communication system comprising:

a plurality of transmitters located at spaced apart sites transmitting a signal including multiplexed channels so that areas of propagation from respective ones of the transmitters substantially overlap over each other in at least a major portion of a reception area; each multiplexed channel containing digitized and compressed broadband information relating to a plurality of programs; and a shared receiving system located within the reception area and serving a plurality of living units, said shared receiving system comprising:

(1) at least one antenna receiving multiple time delayed copies of said signal including multiplexed channels;

(2) a plurality of channel selectors coupled to the at least one antenna, each channel selector selecting a respective one of the multiplexed channels;

(3) a plurality of delay signal processing circuits each connected to one of the channel selectors for processing multiple time delayed copies within a predetermined delay processing window of signals in a respective one of the multiplexed channels, to acquire a single copy of a signal corresponding to the respective one of the multiplexed channels; and (4) a network for distributing information from the acquired single copies of the respective channels to the living units for presentation of selected broadband information.

23. A communication system as in claim 22, further comprising a headend comprising:
(1) a source of a first digital multiplexed data stream containing a plurality of packet streams, each packet stream carrying digitized data representing one of a first group of video programs,
(2) a source of a second digital multiplexed data stream containing a plurality of packet streams, each packet stream carrying digitized data representing one of a second group of video programs,
(3) a modulation system modulating the first digital multiplexed data stream and the second digital multiplexed data stream into first and second channels, respectively; and
a combiner for multiplexing the first and second channels together to form the signal including multiplexed channels.

24. A system as in claim 22, wherein the predetermined delay processing window of the delay signal processing circuit has a value equal to or greater than the difference in propagation time to the at least one antenna from two of the spaced apart transmitters.

25. A system as in claim 22, wherein the predetermined delay processing window of the delay signal processing circuit has a value of approximately 100 microseconds.

26. A system as in claim 22, wherein the delay signal processing circuits comprise time delay equalizers.

27. A method comprising the steps of:
a) simultaneously transmitting from multiple spaced transmitting sites the same signal so that areas of propagation from respective ones of the transmitting sites substantially overlap over each other in at least a major portion of a reception area, said signal transmitted from said transmitting sites including multiplexed channels, each channel carrying digitally multiplexed data representing a plurality of programs; and
b) at one receiving site in the major portion of said reception area:
(i) receiving multiple time-offset copies of said signal,
(ii) processing multiple time-offset copies of each channel within said signal, received within a predetermined processing time window, to produce a single optimized representation of each of said multiplexed channels, and
(iii) distributing information contained in the single optimized representations of said multiplexed channels to a plurality of living units.

28. A method as in claim 27, wherein the step of processing the multiple time-offset copies of said channels comprises:
separating signals containing multiple time-offset copies of each of the multiplexed channels;
processing the separate multiple time-offset copies of each channel received within the predetermined processing time window to produce the single optimized representation of the digitally multiplexed data contained in each of the multiplexed channels; and
combining the single optimized representation of the digitally multiplexed data contained in each of the multiplexed channels to form a single optimized representation of said signal including multiplexed channels for distribution.

29. A method as in claim 28, wherein the step of combining comprises;
modulating the single optimized representation of the digitally multiplexed data contained in each of the multiplexed channels into a transport channel; and
multiplexing the transport channels together.

30. A method as in claim 29, wherein:
the transport channels are channels at different frequencies; and
the multiplexing step comprises frequency division multiplexing the transport channels together.

31. A method as in claim 28, wherein the step of combining comprises;
processing the single optimized representation of the digitally multiplexed data contained in each of the multiplexed channels to produce an individual analog program signal for each of the programs;
modulating each individual analog program signal into a transport channel; and
multiplexing the transport channels together.

32. A method as in claim 31, wherein:
the transport channels are channels at different frequencies; and
the multiplexing step comprises frequency division multiplexing the transport channels together.

33. A method as in claim 28, wherein the step of processing the separate multiple time-offset copies of each channel comprises time domain equalizing the multiple time-offset copies of each channel.

34. A method as in claim 27, further comprising the step of selectively presenting selected ones of the programs to users in a plurality of the living units.

35. A method as in claim 27, wherein the predetermined processing time window has a value equal to or greater than the difference in propagation time to the one receiving site from two of the spaced transmitting sites.

36. A method as in claim 27, wherein the predetermined processing time window has a value approximately 100 microseconds.

* * * * *